US006847967B1

(12) United States Patent
Takano

(10) Patent No.: US 6,847,967 B1
(45) Date of Patent: Jan. 25, 2005

(54) INFORMATION SET IMPORTANCE DETERMINATION SYSTEM AND INFORMATION SET IMPORTANCE DETERMINATION METHOD

(75) Inventor: Hajime Takano, Tokyo (JP)

(73) Assignee: NEC Corporation, Tokyo (JP)

(*) Notice: Subject to any disclaimer, the term of this patent is extended or adjusted under 35 U.S.C. 154(b) by 150 days.

(21) Appl. No.: 09/640,672

(22) Filed: Aug. 18, 2000

(30) Foreign Application Priority Data

Aug. 20, 1999 (JP) .......................................... 11-234403

(51) Int. Cl.[7] .............................................. G06F 07/00
(52) U.S. Cl. ................................ 707/10; 707/3; 707/7; 715/501.1
(58) Field of Search ....................... 715/501.1; 707/513, 707/3, 5, 7, 10; 709/245

(56) References Cited

U.S. PATENT DOCUMENTS

| | | | | |
|---|---|---|---|---|
| 5,940,831 | A | | 8/1999 | Takano ........................ 707/10 |
| 5,960,429 | A | * | 9/1999 | Peercy et al. .................. 707/5 |
| 6,055,542 | A | * | 4/2000 | Nielsen et al. ........... 707/104.1 |
| 6,272,507 | B1 | * | 8/2001 | Pirolli et al. ................ 707/513 |
| 6,278,992 | B1 | * | 8/2001 | Curtis et al. .................... 707/3 |
| 6,336,112 | B2 | * | 1/2002 | Chakrabarti et al. ........... 707/5 |
| 6,353,825 | B1 | * | 3/2002 | Ponte ............................ 707/5 |
| 6,356,899 | B1 | * | 3/2002 | Chakrabarti et al. ........... 707/5 |
| 6,363,377 | B1 | * | 3/2002 | Kravets et al. ................ 707/4 |
| 6,389,436 | B1 | * | 5/2002 | Chakrabarti et al. ........ 707/513 |
| 6,397,210 | B1 | * | 5/2002 | Stern et al. .................... 707/3 |
| 6,397,219 | B2 | * | 5/2002 | Mills ........................... 707/10 |
| 6,401,094 | B1 | * | 6/2002 | Stemp et al. ................. 707/10 |
| 6,418,433 | B1 | * | 7/2002 | Chakrabarti et al. ........... 707/5 |

FOREIGN PATENT DOCUMENTS

| JP | 7-6076 | 1/1995 |
|---|---|---|
| JP | 10-69423 | 3/1998 |
| JP | 10-105550 | 4/1998 |
| JP | 10-222415 | 8/1998 |
| JP | 10-222525 | 8/1998 |

OTHER PUBLICATIONS

"Structure Method of Content Space by WWW Link Information" by Tetsuyuki Sato, 57th (1998, second term) National Conference Collected Works (3), Database and Media Network Processing Society of Japan, Oct. 7, 1998, p. 3–159–3–160.
Botafogo, R.A., "Cluster Analysis for Hypertext Systems", 1993, pp. 116–125.
Takano, H., et al., "Dynamic Bookmarks for the www— Managing Personal Navigation Space by Analysis of Link Structure and User Behavior", HyperText 98, Pittsburgh, PA, 1998, pp. 297–298.
Mukherjea, S., et al., "Focus+Context Views of World–Wide Web Nodes", Hypertext 97, 1997, pp. 187–196.
Brin, S., et al., "The Anatomy of a Large–Scale Hypetextual Web Search Engine", The Anatomy of a Search Engine, 1921, pp. 1–18.

* cited by examiner

Primary Examiner—Greta Robinson
Assistant Examiner—Miranda Le
(74) Attorney, Agent, or Firm—Foley & Lardner LLP

(57) ABSTRACT

The information set importance determination system of the present invention includes a page information management unit for managing an attribute of page information constituting hyper-media information, a ink information management unit for holding and managing linkage between page information, data take-in device for registering hyper-media information in the page information management unit and the link information management unit, a page analysis unit for determining an importance of each page, a link analysis unit for determining a weight of each link based on link information, and a page set sorting unit for sorting a page set based on a page importance of each page.

28 Claims, 23 Drawing Sheets

INFORMATION SET IMPORTANCE DETERMINATION SYSTEM AND INFORMATION SET IMPORTANCE DETERMINATION METHOD

BACKGROUND OF THE INVENTION

1. Field of the Invention

The present invention relates to a system and a method for determining importance of an information set in hyper-media information on a network and a recording medium which records an information set and an importance determination program thereof and, more particularly, to an information set importance determination system, an information set importance determination method, and a recording medium recording an information set and an importance determination program thereof which enable labor required for selecting information to be reduced by presenting page information needed by a user as higher-order information in a given page list.

2. Description of the Related Art

Recent remarkable widespread of systems for sending and sharing information using a computer network makes it possible to make use of information in small-sized LAN (Local Area Network) environments and in medium-sized intra-net environments, and moreover, in over-Japan or world-wide environments. These information constitute hyper-media information made up of a page as part of information and links which are relations among pages. Starting with an arbitrary page, pages of volumes of related information can be traced one by one.

One of representatives of the above-described hyper-media information system is WWW (World-Wide Web) whose components are three, HTML (Hypertest Mark-up Language) which defines a page description format, URL (Universal Resource Locator) which defines an address of a page on a network and HTTP (Hypertest Transfer Protocol) as a communication procedure for downloading a page existing at an address indicated by a URL. A system for downloading and reading information pages is called WWW browser (hereinafter referred to as browser) and a system for managing and transferring the information page through the HTTP in response to a request from a browser is called WWW server (hereinafter referred to as server). WWW has already attained a position of an indispensable application in Internet which is a network established all over the world and is said to exist as many as several 100 millions of pages.

It is extremely difficult to take out desired information from among such pages existing extremely widely and in large volumes as WWW, so that various search engines have been developed and put into use. A search engine is composed of a crawler for collecting pages existing on a network by repeating a series of operation of analyzing the HTML of a page on the network and obtaining a URL of a destination of a link established and a retrieval engine for conducting full-text search by using, for example, a keyword, based on a collected page.

Under these circumstances, when more than several millions of pages in domestic Japan, for example, are collected to execute retrieval by a keyword, most of retrieval results will be on the order of hundreds to tens of thousands. Moreover, since these output retrieval results are not in order based on their addresses and contents, browsing of the retrieval results will put heavy labor on a user.

To make a browsing procedure be more efficient, it is necessary to appropriately determine a structure of information to be output to a user, and put the information in order, and select and process the same. In other words, what should be done are setting a range of an appropriate information set, finding a representative page and a main structure of an information set and adopting or rejecting and processing each information in an information set. Here, an information set represents a set of information regarding a specific page set selected by search etc. (page information, link information), which is made up of a representative page and its member pages.

So far, several related art have been proposed in these views. In the following, such related art will be described.

First conventional art is recited in Japanese Patent Laid-Open No. 10-069423. In the conventional information set importance determination system, a directory server which centrally manages page attribute values of hyper-media information existing on a network has a directory information storage unit for managing a page attribute value of hyper-media information, a secondary information generation unit for generating secondary information from the attribute value and a function generated by secondary information. In the conventional information set importance determination system, information sets of hyper-media are generated using a host name and a directory name. In addition, obtained information sets are aggregated using a network structure such as a host name or a domain name. However, since according to the technique, determination of an information set is made taking only a place of a page into consideration, appropriate determination might not be possible depending on a page management policy varying with a server. Also since determination of an information set to be aggregated is made by using a network structure, appropriate determination might not be possible when many information sets exist in the same domain.

Second conventional art is recited in "Proceedings of the Sixteenth Annual International ACM SIGIR Conference", pp. 116–125, June 1993. In the conventional information set importance determination system, a range of an information set is determined using linkage among pages, particularly, a strength of a link. However, since the technique takes only application to hyper-media information edited by the same editor into consideration and takes only relations among information pages into consideration to determine an information set, application to hyper-media information on a network such as the WWW is difficult.

Third conventional are is recited in "Proceedings of 9th ACM Conference on Hypertext and Hyper-media 98", pp. 297–298, June 1998. In the conventional information set importance determination method, not only an information set is generated using a host name and a directory name but also its representative page is determined according to an agreement with a file name prepared in advance. By this method, however, other information pages than a file name registered in advance can not be determined as a representative page.

Fourth conventional art is recited in Japanese Patent Laid-Open No. 10-105550. In the art, defining a layered structure among respective pages at the time of generating hyper-media information enables use of information pages with a layered structure among information pages in mind at the time of browsing the information pages. The method, however, is allowed to use only an information structure in hyper-media information edited in advance using the present art and not a structure among information pages edited by other existing methods.

As the fifth conventional art, there is Excite Japan (http://www.excite.co.jp/) which is one of WWW search engines put into practice in recent years. In the present conventional art, grouping keyword retrieval results to be output according to host names to suit user's convenience at the time of browsing retrieval results. The method, however, does not always have an information set and a host coincide with each other and unless a home page is included in the retrieval results, it will not be presented. In addition, when volumes of pages whose contents are almost similar such as messages of a mailing list are included in retrieval results, the pages will be output as they are. Moreover, unless index pages which originally help users in browsing are included in retrieval results, they will not be output.

As indicated in the first and the second conventional art, the first problem is that in the determination of a range of an information set, a range intended by an information creator can not be accurately determined.

The reason is that limited attribute information is used such as only a host name or a directory name, or only linkage.

As indicated in the third and the fourth conventional art, the second problem is that an information creator is not allowed to determine a representative page of a target information set.

The reason is that each page has no attribute value indicative of such an information structure.

As indicated in the fifth conventional art, the third problem is that in a given set of information pages, there is no basis for adopting or rejecting pages.

The reason is that an information structure in an information set is not determined.

SUMMARY OF THE INVENTION

A first object of the present invention is to provide an information set importance determination system targeting hyper-media information on a network which enables labor required for selecting information to be reduced by sorting applied page lists in descending order of value for a user and presenting page information needed by the user as higher-order information, and an information set importance determination method thereof.

A second object of the present invention is to provide an information set importance determination system targeting hyper-media information on a network which, when no appropriate representative page is included in applied page lists, enables a representative page that has not matched at the time of retrieval to be presented to a user by inserting a representative page into the lists and sorting the same, and an information set importance determination method thereof.

A third object of the present invention is to provide an information set importance determination system targeting hyper-media information on a network which enables reduction in the number of retrieval results to be presented to a user by cutting off unnecessary pages from applied page lists, and an information set importance determination method thereof.

According to the first aspect of the invention, an information set importance determination system, wherein
  pages existing on each server are collected from hyper-media information on a network to obtain a link reference state of each page over each server,
  an importance of each page is determined using the link reference state, and
  a page set made up of a plurality of the pages is sorted based on the page importance of each page.

In the preferred construction, the information set importance determination system comprises
  page information management means for managing an attribute of page information constituting the hypermedia information,
  link information management means for holding and managing linkage between the page information,
  page information registration means for registering the hyper-media information in the page information management means and the link information management means,
  page analysis means for determining an importance of each page,
  link analysis means for determining a weight of each link based on the link information, and
  page set sorting means for sorting the page set based on the page importance of each page.

In another preferred construction, the information set importance determination system comprises
  page information management means for managing an attribute of page information constituting the hypermedia information,
  link information management means for holding and managing linkage between the page information,
  page information registration means for registering the hyper-media information in the page information management means and the link information management means,
  page analysis means for determining an importance of each page,
  link analysis means for determining a weight of each link based on the link information,
  page set sorting means for sorting the page set based on the page importance of each page,
  information set management means for managing a range of an information set to which each page belongs and the page as an element of the information set, and
  information set determination means for determining an information set to which each page belongs, wherein
  the page set sorting means sorts the page set applied from an input device based on the information set and the importance of each page and outputs sorting results to an output device.

In another preferred construction, the information set importance determination system comprises
  page information management means for managing an attribute of page information constituting the hypermedia information,
  link information management means for holding and managing linkage between the page information,
  page information registration means for registering the hyper-media information in the page information management means and the link information management means,
  page analysis means for determining an importance of each page,
  link analysis means for determining a weight of each link based on the link information,
  page set sorting means for sorting the page set based on the page importance of each page, and
  representative page determination means for determining a representative page of an information set, wherein
  the page set sorting means, when the representative page of an information set to which each page belongs is not included in the page set applied from an input device, inserts the representative page into the page set, sorts the page set based on the information set and an importance of each page, and outputs sorting results to an output device.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, information set management means for managing a range of an information set to which each page belongs and the page as an element of the information set, information set determination means for determining an information set to which each page belongs, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device.

In another preferred construction, the information set importance determination system comprises page information management means for managing an attribute of page information constituting the hyper-media information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means checks the number of links to each page in the information set from a page outside the information set and determines that a page whose number of links is the largest is a representative page of the information set.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each the page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, representative page determination means for determining a representative page of an information set, and representative page candidate storage means for storing a file name for use in determining the representative page, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of the pages exist whose number of links from a page output the information set is the largest and whose number of links from a page within the information set is the largest, sequentially compares the file name stored in the representative page candidate storage means and a file name that the page has and determines a page whose file name coincides with the stored file name as a representative page of the information set.

In another preferred construction, the information set importance determination system comprises page information management means for managing an attribute of page information constituting the hyper-media information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means checks the number of links to each page in the information set from a page outside the information set and determines that a page whose number of links is the largest is a representative page of the information set, takes out a low-order directory located at the same depth, and selects a page whose number of link references is the largest in each of the low-order directories and when a total of the number of the link references is larger than the number of link references of a page determined as the representative page, recursively executes the representative page determination processing for each low-order directory.

In another preferred construction, the information set importance determination system comprises page information management means for managing an attribute of page information constituting the hyperme-dia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the information set determination means takes out a page stored in the page information management means on a server basis through the page analysis means, selects the representative page from the page on the server, with the representative page as a starting point, sequentially traces a link to a page existing in the same directory as that of the representative page, determines the page obtained to be a member of an information set, and registers the information set obtained in the information set management means.

In another preferred construction, the information set importance determination system comprises page information management means for managing an attribute of page information constituting the hyperme-dia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, the information set determination means takes out a page stored in the page information management means on a server basis through the page analysis means, selects the representative page from the page on the server, with the representative page as a starting point, sequentially traces a link to a page existing in the same directory as that of the representative page, determines the page obtained to be a member of an information set, and registers the information set obtained in the information set management means, and the information set determination means deletes, from the information set, a page which exists in a directory below the same directory on the server determining a range of the information set and which is not reachable by sequential tracing of links with the representative page as a starting point, and sets the deleted page to belong to an information set to which a page holding a link to the deleted page belongs.

In another preferred construction, the information set importance determination system comprises page information management means for managing an attribute of page information constituting the hyper-media information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means f or determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means.

In another preferred construction, the information set importance determination system comprises page information management means for managing an attribute of page information constituting the hyper-media information, link information management means for holding and managing linkage between the page information, page information registration means for registering the hyper-media information in the page information management means and the link information management means, page analysis means for determining an importance of each page, link analysis means for determining a weight of each link based on the link information, page set sorting means sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means, wherein the information tree determination means sequentially takes out an information set and a page as an element of the information set from the information set management means, with respect to all the pages taken out, counts the number of links from a page within the information set, sets a link source page of a page whose number of links made is 1 as a parent page, sequentially takes out a sub-directory in ascending order of layer, checks a link source page linking a child page belonging to a sub-directory of the page, with respect to each link source page, counts a frequency of parentage as the number of links to a page in a directory, starting with the link source page having the largest number of links among the link source pages, sequentially sets the link source page as a parent page of each child page linked to the link source page, and executes a series of the foregoing processing to all the pages to set a parent page.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, where in the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means, wherein the information tree determination means sequentially takes out an information set and a page as an element of the information set from the information set management means, with respect to all the pages taken out, counts the number of links from a page within the information set, sets a link source page of a page whose number of links made is 1 as a parent page, sequentially takes out a sub-directory in ascending order of layer, checks a link source page linking a child page belonging to a sub-directory of the page, with respect to each the link source page, counts a frequency of parentage as the number of links to a page in a directory, starting with the link source page having the largest number of links among the link source pages, sequentially sets the link source page as a parent page of each child page linked to the link source page, executes a series of the foregoing processing to all the pages to set a parent page, with respect to all the pages in the information set, counts a frequency of parentage as the number of child pages which have each page as a parent page, and labels a page having the frequency of parentage higher than a predetermined value as "INDEX".

In another preferred construction, the information set importance determination system further comprises information set selection means for selecting the information set closely related, and information set aggregation means for aggregating a plurality of the information set selected by the information set selection means to generate a new information set.

In another preferred construction, the information set importance determination system further comprises information set selection means for selecting the information set closely related, and information set aggregation means for aggregating a plurality of the information sets selected by the information set selection means to generate a new information set, wherein the information set selection means generates a new information set based on overlap in position on a network to which the information set belongs.

In another preferred construction, the information set importance determination system further comprises information set selection means for selecting the information set closely related, and information set aggregation means for aggregating a plurality of the information sets selected by the information set selection means to generate a new information set, wherein the information set selection means counts the number of links existing between the information sets to take an information set whose number of links exceeds a fixed value as a new information set.

In another preferred construction, the information set importance determination system further comprises information set selection means for selecting the information set closely related, and information set aggregation means for aggregating a plurality of the information sets selected by the information set selection means to generate a new information set, wherein the information set selection means calculates an intensity of a relation between the plurality of the information sets using overlap in position on a network to which the information set belongs and the number of links existing between the information sets, and takes an information set whose intensity of a relation exceeds a fixed value as a new information set.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means f or determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means, and page set sorting means f or sorting and outputting the page sets applied according to the information set and a structure of the information tree of the information set.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means, and page set sorting means for sorting and outputting the page sets applied according to the information set and a structure of the information tree of the information set, wherein the page set sorting means groups the page sets applied on the information set basis, checks the importance preset for a page belonging to each group, sets the maximum value of the importance as a group importance, sorts each group based on the group importance, and sequentially outputs pages in the group in descending order of the page importance based on the sorting results of the group.

In another preferred construction, the information set importance determination system comprises page information management means for managing an attribute of page information constituting the hypermedia information, link information management means for holding and managing linkage between the page information, page information registration means for registering the hyper-media information in the page-information management means and the link information management means, page analysis means for determining an importance of each page, link analysis means for determining a weight of each link based on the link information, page set sorting means for sorting the page set based on the page importance of each page, and representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:

information tree determination means for determining a main relationship of each page in the information set and setting a parent page of each page and a role in the information set at the page management means, and page set sorting means for sorting and outputting the page sets applied according to the information set and a structure of the information tree of the information set, wherein the page set sorting means checks the importance preset for a page belonging to each group, sets the maximum value of the importance as a group importance, sorts each group based on the group importance, checks a parent page of each page belonging to the group, when the parent page is a representative page or a page having a label "INDEX" and fails to exist in the group, inserts the parent page into the group, and sequentially outputs pages in the group in descending order of the page importance based on sorting results of the group.

In another preferred construction, the information set importance determination system comprises page information management means for managing an attribute of page information constituting the hypermedia information, link information management means for holding and managing linkage between the page information, page information registration means for registering the hyper-media information in the page information management means and the link information management means, page analysis means for determining an importance of each page, link analysis means f or determining a weight of each link based on the link information, page analysis means for determining an importance of each page, representative page determination means for determining a representative page of an information set, wherein the page set sorting means, when the representative page of an information set to which each page belongs is not included in the page set applied from an input device, inserts the representative page into the page set, sorts the page set based on the information set and an importance of each page, and outputs sorting results to an output device, and the representative page determination means, when a plurality of pages exist whose number of links from a page outside the information set is the largest, determines that a page whose number of links from a page within the information set is the largest is a representative page of the information set, and further comprising:
information tree determination means for determining a main relationship of each page in the information set and setting a parent page of each page and a role in the information set at the page management means, and
page set sorting means for sorting and outputting the page sets applied according to the information set and a structure of the information tree of the information set, wherein
the page set sorting means
checks the importance preset for a page belonging to each group,
sets the maximum value of the importance as a group importance,
sorts each group based on the group importance,
checks a parent page of each page belonging to the group,
when the parent page is a representative page or a page having a label "INDEX" and fails to exist in the group, inserts the parent page into the group,
sequentially outputs pages in the group in descending order of the page importance based on sorting results of the group, and
when the number of child pages linked by a page having the "INDEX" label within the group exceeds a fixed value, deletes the child pages except for a fixed number of child pages whose the page importance is high and outputs the remaining child pages.

According to the second aspect of the invention, an information set importance determination method, comprises the steps of:
storing an attribute of page information constituting hyper-media information on a network in page information management means and linkage between the page information in link information management means,
checking link references to each page to determine a weight of each link,
determining an importance of each page using the obtained weight of the link and the page information, and
sorting a page set made up of a plurality of pages applied from an input device based on the importance of each page and outputting sorting results to an output device.

In the preferred construction, the information set importance determination method further comprises the steps of:
taking out the page information stored in the page information management means on a server basis,
determining pages under a route directory on the server as a first information set on the server,
checking the number of links of pages immediately under the route directory from a page outside the server,
determining a page whose number of links made is the largest as a representative page of the first information set,
when the representative page of an information set to which each page belongs is not included in the page set applied from the input device, inserting the representative page into the page set, and
sorting the page set based on the information set and the importance of each the page to output sorting results to an output device.

In another preferred construction, the information set importance determination method further comprising the steps of:
counting the number of links of each of all the taken out page from a page within an information set,
setting a link source page of a page whose number of links made is 1 as a parent page,
taking out a sub-directory in a descending order of layer,
checking a link source page linking a child page belonging to a sub-directory of the page,
with respect to each the link source page, counting a frequency of parentage as the number of links to a page in a directory,
starting with the link source page having the largest number of links among the link source pages, sequentially setting the link source page as a parent page of each child page linked to the link source page, and
executing a series of the foregoing processing to all the pages to set a parent page.

In another preferred construction, the information set importance determination method further comprises the steps of:
grouping applied page sets on an information set basis,
checking an importance preset for a page belonging to each group,
setting the maximum value of the importance as a group importance,
sorting each group based on the group importance, and
sequentially outputting pages in a group in descending order of page importance based on the group sorting results.

In another preferred construction, the information set importance determination method further comprises the steps of:
grouping applied page sets on an information basis,
checking an importance preset for a page belonging to each group,
setting the maximum value of the importance as a group importance,
sorting each group based on the group importance,
sequentially outputting pages in a group in descending order of page importance based on the group sorting results,
checking the importance preset for a page belonging to each group,
setting the maximum value of the importance as the group importance,
sorting these groups based on the group importance,
checking a parent page of each page belonging to a group,
when the parent page is a representative page or a page having a label "INDEX" and fails to exist in a group, inserting the parent page into the group,
sequentially outputting pages in a group in descending order of the page importance based on group sorting results, and
when the number of child pages linked by a page having the "INDEX" label within the group exceeds a fixed value, deleting the child pages except for a fixed number of child pages whose the page importance is high and outputting the remaining child pages.

According to the third aspect of the invention, a computer readable memory records an information set importance determination program to be executed by a computer, wherein the information set importance determination program executes the processing of:

collecting a page existing on each server from hyper-media information on a network to obtain a link reference state of each page within and outside each server, determining an importance of each page using the link reference state, and executing processing of sorting a page set made up of a plurality of the pages based on the page importance of each page.

According to another aspect of the invention, a computer readable memory records an information set importance determination program to be executed by a computer, the information set importance determination program controlling the computer to execute:

page information management processing of managing an attribute of page information constituting the hyper-media information, link information management processing of holding and managing linkage between the page information, page information registration processing of registering the hyper-media information for the page information management processing and the link information management processing, page analysis processing of determining an importance of each page, link analysis processing of determining a weight of each link based on the link information, and page set sorting processing of sorting the page set based on the page importance of each page.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

Figure 1:
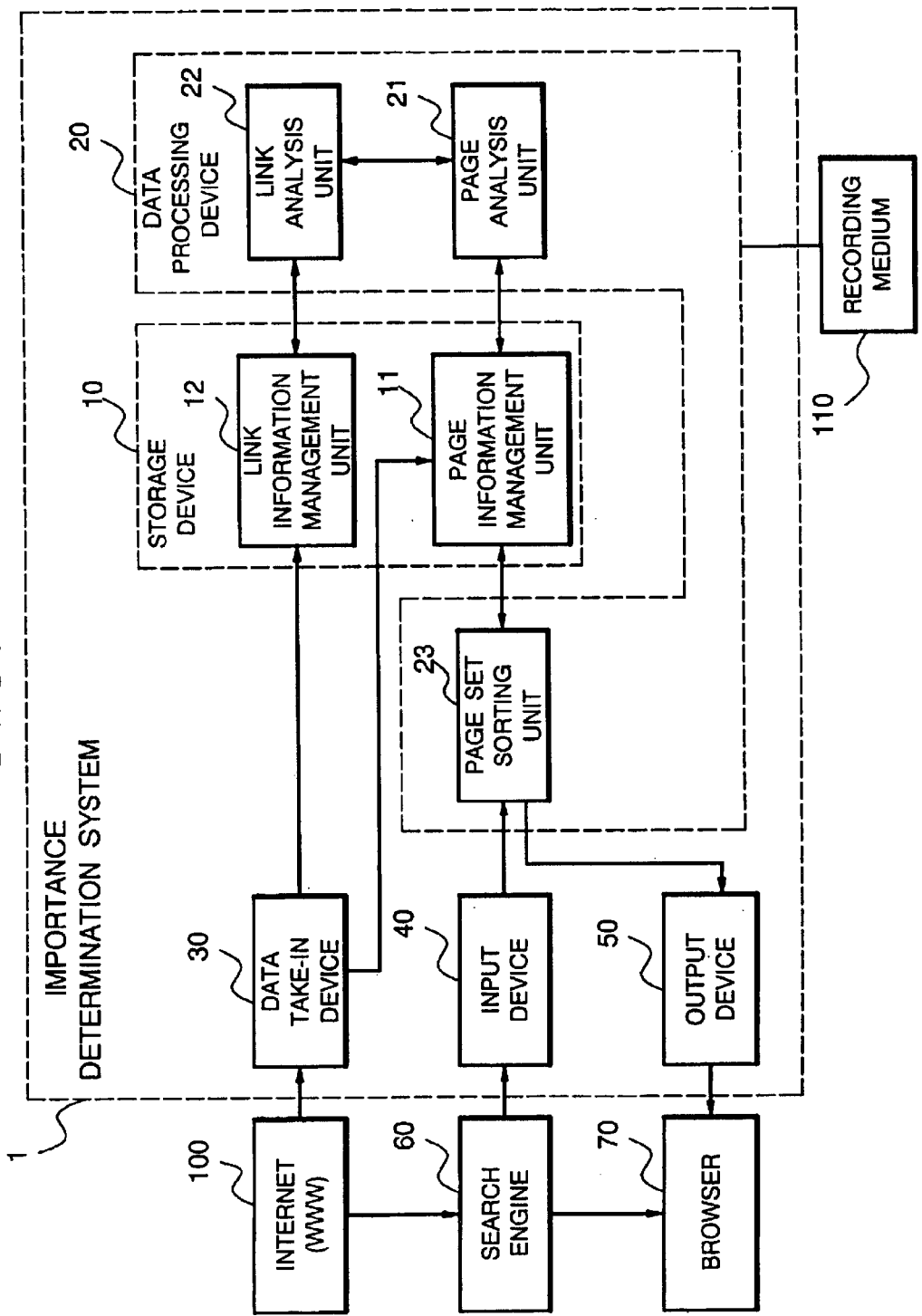
FIG. 1 is a block diagram showing a structure of an importance determination system according to a first embodiment of the present invention.

In the following, preferred embodiments of the present invention will be described in detail with reference to the drawings. FIG. 1 is a block diagram showing a structure of an importance determination system according to the first embodiment of the present invention.

With reference to FIG. 1, an importance determination system 1 according to the first embodiment of the present invention includes a storage device 10 for storing data, a data processing device 20 operable under the control of a program, a data take-in device 30 for taking in data from a file and data base on an internet (WWW) 100 and registering the same in the storage device 10, an input device 40 for receiving input of search results (URL lists) searched by a search engine 60 from a browser 70 which uses the internet 100, and an output device 50 such as a display or file.

The storage device 10 includes a page information management unit 11 and a link information management unit 12.

The page information management unit 11 stores page information about a page which is registered in the storage device 10 by the data take-in device 30 and whose importance is to be determined.

The link information management unit 12 stores information about links among pages which are registered in the storage device 10 by the data take-in device 30 and whose importance is to be determined.

The data processing device 20 includes a page analysis unit 21, a link analysis unit 22 and a page set sorting unit 23.

The page analysis unit 21 takes out a page set to be analyzed from the page information management unit 11, calculates a page importance of an individual page set taken out and stores the calculation result in the page information management unit 11.

The link analysis unit 22 takes, regarding page information designated by the page analysis unit 21, related link information from the link information management unit 12, determines an importance of an individual link taken out and stores the result in the link information management unit 12.

The page set sorting unit 23 sorts, for example, a page set as a search result obtained by the search by the search engine 60 which is handed through the input device 40 according to importance stored in the information management unit 11 and outputs sorting results to the output device 50.

Figure 2:
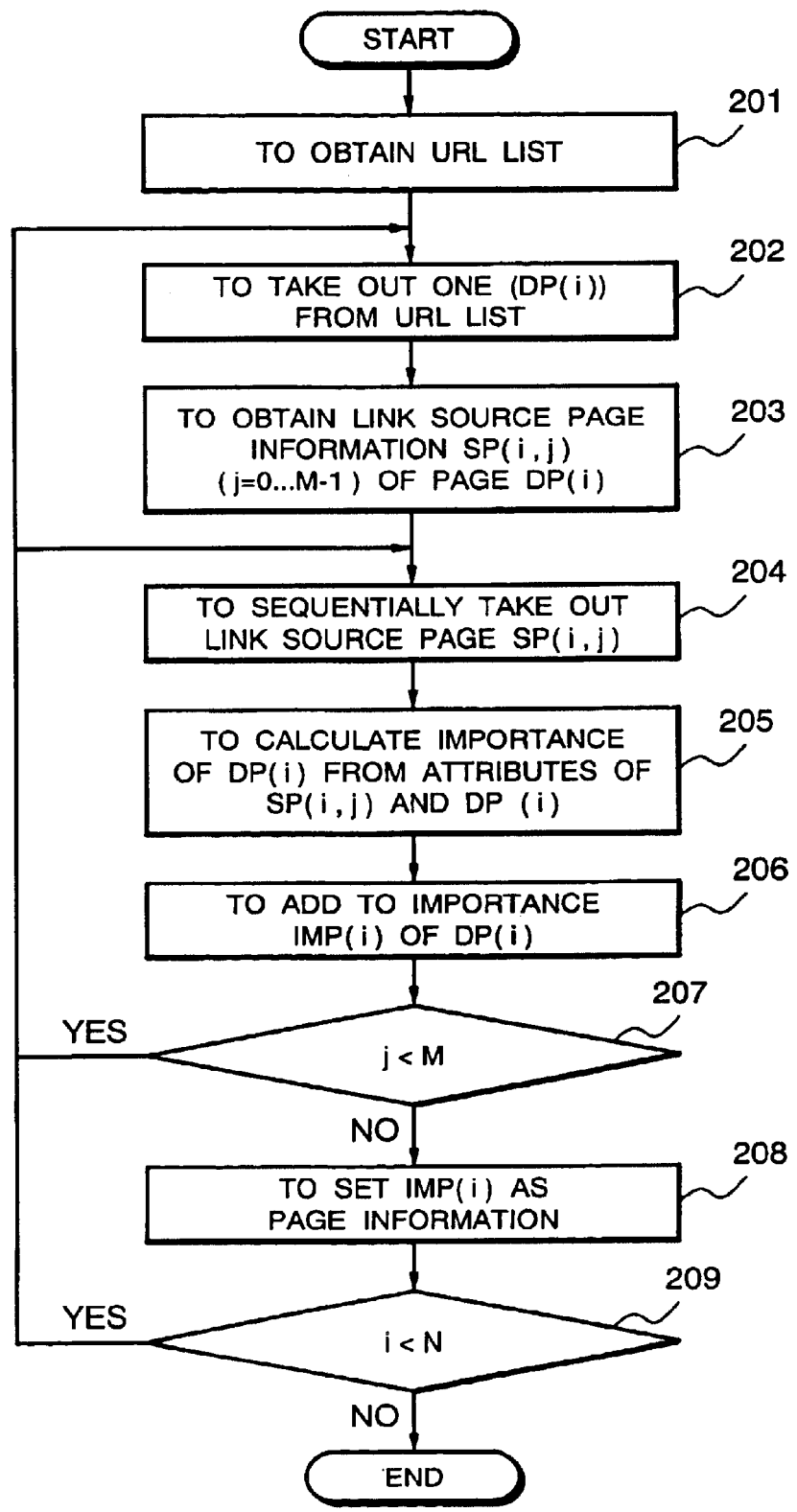
FIG. 2 is a flow chart for use in explaining processing of determining an importance according to the first embodiment of the present invention.

Next, importance determination processing according to the present embodiment will be described in detail with reference to the drawing. FIG. 2 is a flow chart for use in explaining importance determination processing according to the first embodiment of the present invention.

The data take-in device 30 registers page information and link information stored in a data base which is generated in advance by collecting hyper-media information on a network such as WWW in the page information management unit 11 and the link information management unit 12, respectively. It is assumed that as one of attributes constituting page information, an address on the network, for example, a URL in the WWW, is set to be "http://www.nec.co.jp/".

Assume here that a page address on the network is denoted as URL. It is accordingly assumed that one record of link information is made up of a link resource URL and a link destination URL.

In the processing of determining importance according to the present embodiment, each variable is set as follows.

With a certain URL, its link destination URL (in a case where a number N of link destinations URLs exist) is represented as DP(i) (i=1, ..., N−1), a link source URL for one DP(i) as a link destination URL (in a case where a number M of link source URLs exist) is represented as SP(i,j) (j=0, ..., M−1) and an importance of one DP(i) as a link destination URL is represented as IMP(i).

The page analysis unit 21 obtains an URL list made by listing URLs of pages to be searched from the page information management unit 11 (Step 201).

Next, the page analysis unit 21 sequentially takes out URLs from the URL list and notifies the same to the link analysis unit 22.

The link analysis unit 22 takes out DP(i) (i=0, ..., N−1) as a link destination URL of the notified URL from the link information management unit 12 (Step 202) to obtain a list of URLs to be linked which holds a link to the DP(i) taken out through the link analysis unit 22 (Step 203).

The link analysis unit 22 sequentially takes out SP(i,j) as a link source URL from the list of URLs to be linked (Step 204) and calculates its importance (Step 205).

Here, applied for the calculation of an importance is a method of setting an importance to be high when SP(i,j) (j=0, ..., M−1) as a link source URL and DP(i) as a link destination URL exist on different servers, and to be low when they are on the same server. More specifically, when the SP(i,j) (j=0, ..., M−1) as a link source URL and the DP(i) as a link destination URL exist on different servers, "1" is added to the importance and when they are on the same server, no value is added. The importance calculated here is added to an importance IMP(i) of the DP(i) as a link destination URL (Step 206).

Method of setting an importance of a page is not limited to the above-described method and other methods may be also applicable. The following are among known importance setting methods and they will be employed in the present invention.

First is the method of counting the number of documents (pages) traceable by one or two clicks and setting the number as an importance of the page, which is recited in "Sougata Mukherjea and Yoshinori Eara: Focus+Content Views of World-Wide Web Nodes, Proceedings of ACM Hypertext '97, ACM Press, pp. 187–196". Second is the method of calculating an intensity of reference between individual pages as an importance of the page based on the entire structure of a relationship between links connected to each other, which is recited in "Sergey Brin and Lawrence Page, The Anatomy of a Large-Scale Hypertextual Web Search Engine, Proceedings of the 7th WWW Conf., pp. 107–117, May 1998".

The link analysis unit 22 executes processing of Step 204 to 207 with respect to all the SPs(i,j) as a link source URL for the DP(i) (Step 207).

The unit 22 notifies the page analysis unit 21 of the value of the importance IMP(i) at the time when the processing is completed and the page analysis unit 21 sets the notified importance IMP(i) as an importance of the page DP(i) at the page information management unit 11 (Step 208).

The page analysis unit 21 subsequently executes the processing of Steps 202 to 208 for all the remaining URL list DPs(i) (i=0, ..., N−1) (Step 209).

By the foregoing procedure, page importance of each URL is set at the page information management unit 11.

The page set sorting unit 23 obtains, from the page information management unit 11, an importance of a page corresponding to an individual URL from a set of URLs as search results, for example, obtained by the search by the search engine 60 and input through the input device 40, sorts the page set according to the importance and outputs the results to the output device 50 which is a display or a file.

As described in the foregoing, since the present embodiment includes a unit for determining an importance based on not only a network address of each page but also linkage, it can obtain not a page importance calculated simply based on characteristics of the page itself, but a page importance taking relationships with other related information into consideration.

In the present invention, importance calculation at Step 205 of FIG. 2 is made based on whether a server in which a link source URL exists and a server in which a link destination URL exists coincide with each other or not. Other possible method is adding "1" to the importance when a link exists between a server in which a link destination URL exists and a server in which a link source URL exists irrespective of the number of links. Further possibility is a method of calculating an importance taking not only coincidence in servers but also coincidence in directories into consideration.

Figure 3:
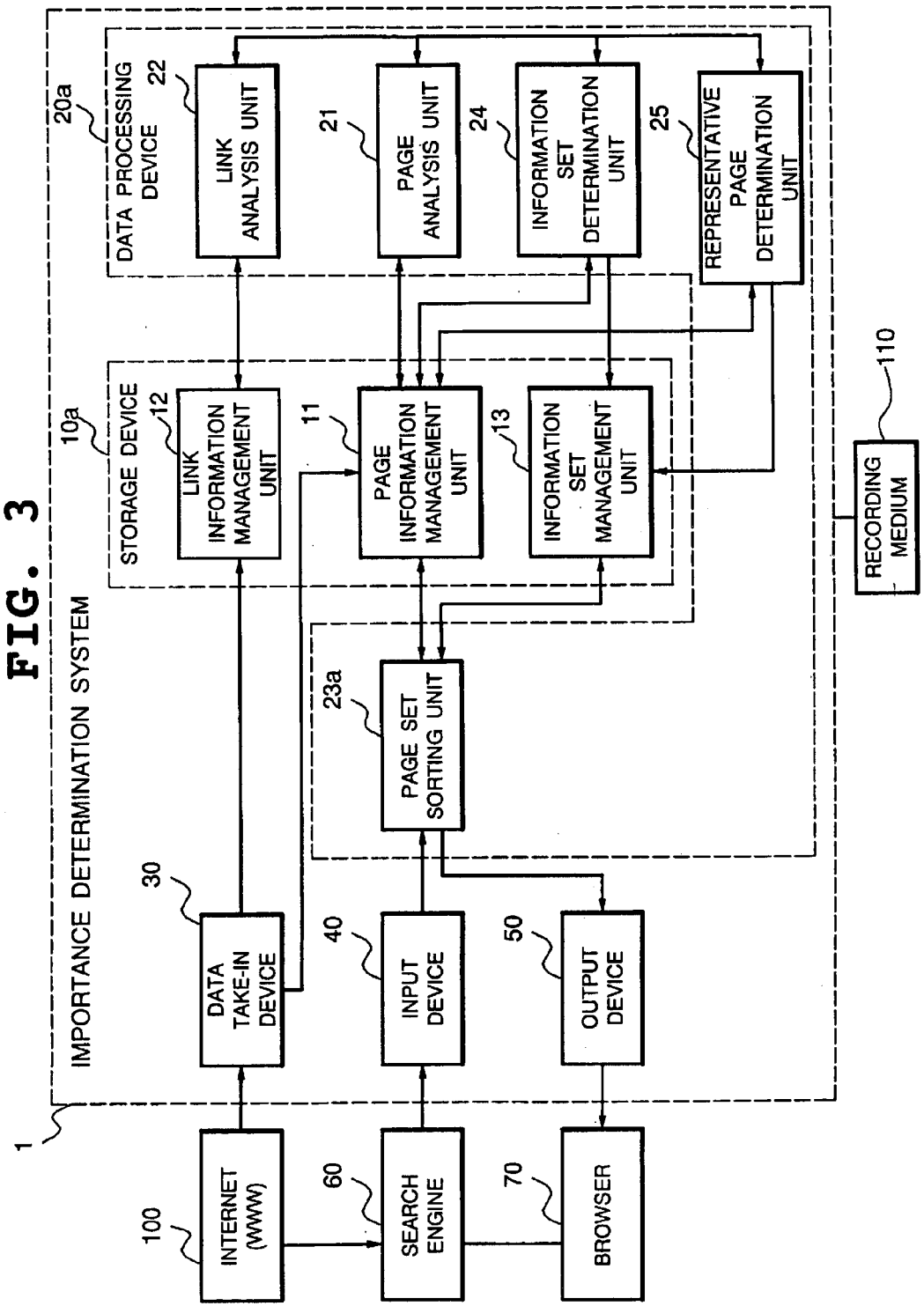
FIG. 3 is a block diagram showing a structure of an importance determination system according to a second embodiment of the present invention.

Next, the second embodiment of the present invention will be described in detail with reference to the drawings. FIG. 3 is a block diagram showing a structure of an importance determination system 1 according to the second invention of the present invention.

With reference to FIG. 3, the importance determination system according to the second embodiment of the present invention differs from that of the first embodiment shown in FIG. 1 in that it includes, at a storage device 10a, an information set management unit 13 in addition to the components of the storage device 10 of the first embodiment shown in FIG. 1, includes, at a data processing device 20a, an information set determination unit 24 and a representative page determination unit 25 in addition to the components of the data processing device 20 of the first embodiment shown in FIG. 1 and further includes a page set sorting unit 23a which is an extension of the page set sorting unit 23 of the first embodiment.

The information set management unit 13 holds a range of an information set made up of a representative page and its member pages, and a list of URLs as its constituent members.

Figure 4:
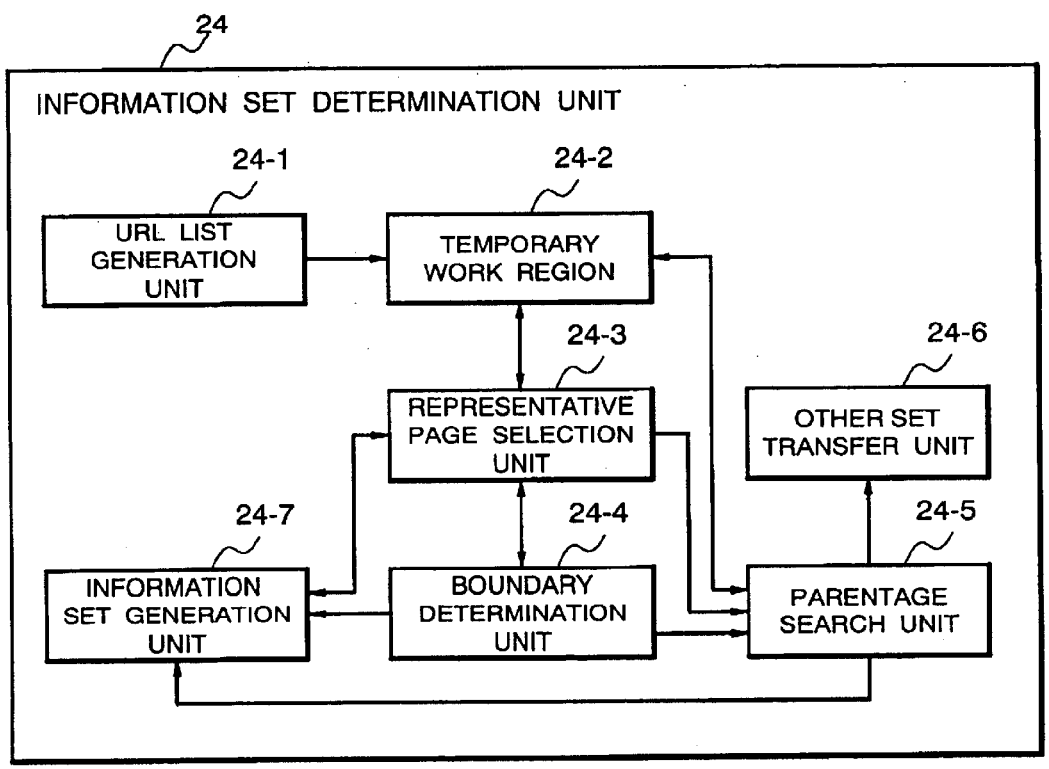
FIG. 4 is a block diagram showing a structure of an information set determination unit according to the second embodiment of the present invention.

FIG. 4 is a block diagram showing a structure of the information set determination unit 24 according to the second embodiment of the present invention.

With reference to FIG. 4, the information set determination unit 24 of the second embodiment includes a URL list generation unit 24-1, a temporary work region 24-2, a representative page selection unit 24-3, a boundary determination unit 24-4, a parentage search unit 24-5, an other set transfer unit 24-6 and an information set generation unit 24-7.

Figure 23:
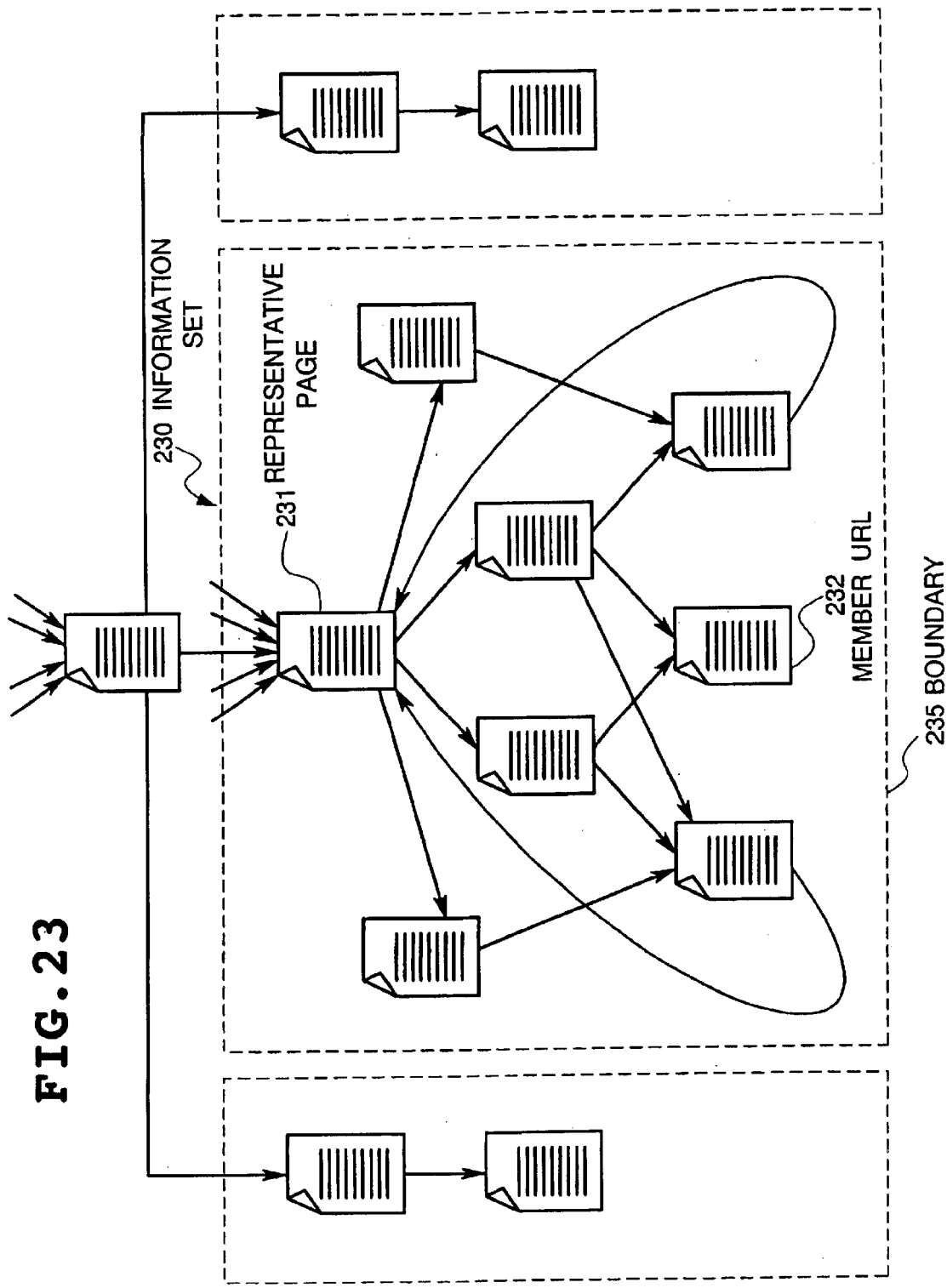
FIG. 23 is a diagram for use in explaining a concept of an information set and a boundary.

The information set determination unit 24 determines an appropriate information set for every page stored in the page information management unit 11 by means of the page analysis unit 21 and the link analysis unit 22. The information set determination unit further determines an importance of each page based on a boundary of an information set stored in the information set management unit 13. Boundary represents conditions of application as a member for a certain information set made up of a representative page and its member pages. Here, a concept of an information set and a boundary is shown in FIG. 23. In FIG. 23, indicated by dotted lines is a boundary 235 which shows a boundary of an information set 230. Each information set 230 is made up of a representative page 231 and a plurality of member URLs 232. Arrows in the figure indicate links.

Figure 5:
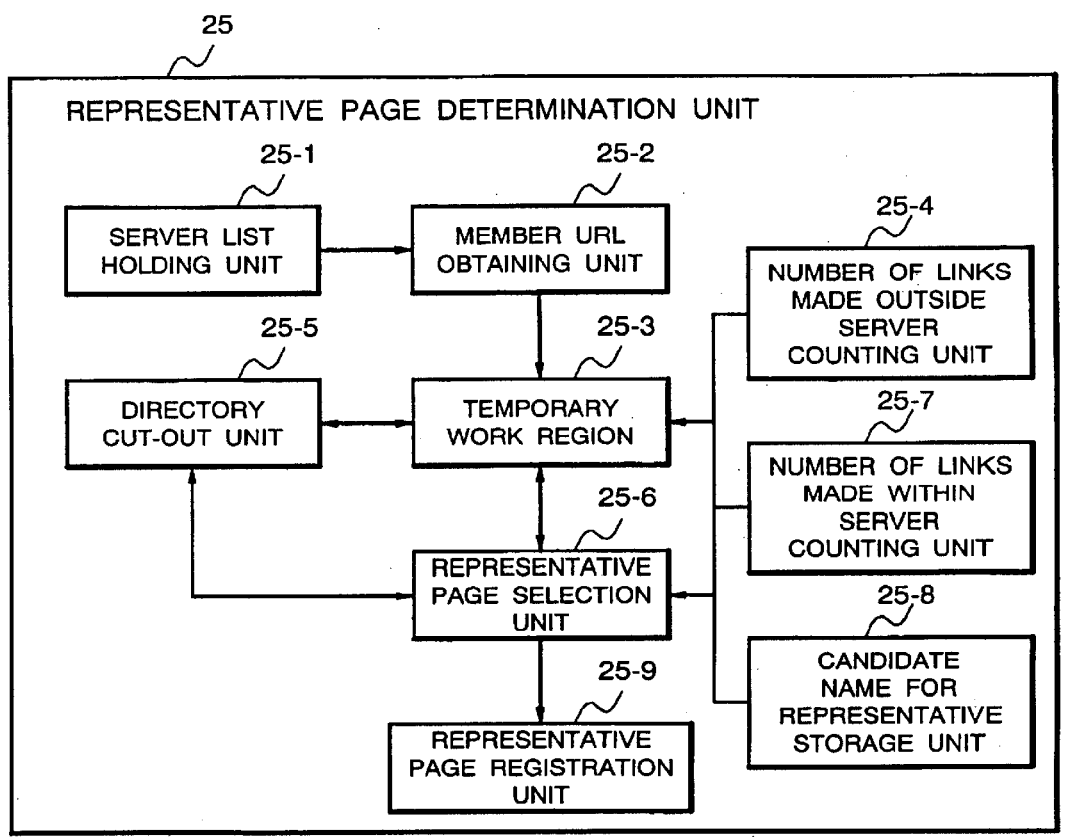
FIG. 5 is a block diagram showing a structure of a representative page determination unit according to the second embodiment of the present invention.

FIG. 5 is a block diagram showing a structure of the representative page determination unit 25 according to the second embodiment.

With reference to FIG. 5, the representative page determination unit 25 includes a server list holding unit 25-1, a member URL obtaining unit 25-2, a temporary work region 25-3, a number of links made outside server counting unit 25-4, a directory cut-out unit 25-5, a representative page selection unit 25-6, a number of links made within server counting unit 25-7, a candidate name for representative storage unit 25-8 and a representative page registration unit 25-9.

The representative page determination unit 25 determines a page to be a representative page of an information set from among pages stored in the page information management unit 11 by means of the page analysis unit 21 and the link analysis unit 22.

Figure 6:
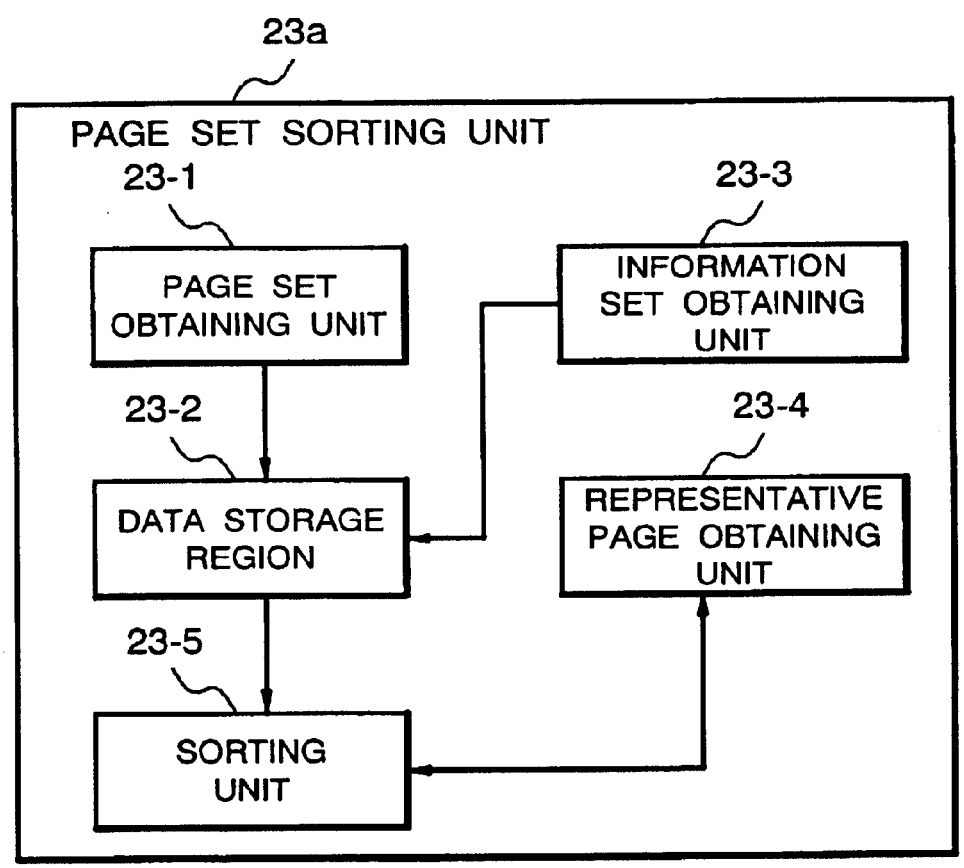
FIG. 6 is a block diagram showing a structure of a page set sorting unit according to the second embodiment of the present invention.

The page set sorting unit 23a, as shown in FIG. 6, includes a page set obtaining unit 23-1, a data storage region 23-2, an information set obtaining unit 23-3, a representative page obtaining unit 23-4 and a sorting unit 23-5, and using a page importance stored in the page information management unit 11 and information set data stored in the information set management unit 13, sorts a page set as a retrieval result obtained by the retrieval by the search engine 60 which is transferred through the input device 40 and outputs the stored page set to the output device 50.

Next, operation of the present embodiment will be described in detail with reference to FIGS. 7 to 11.

The processing conducted by the data take-in device 30 to register data (page information and link information) in the page information management unit 11 and the link information management unit 12 and the processing conducted by the page set sorting unit 23 to sort a URL set applied from the input device 40 according to each page importance of its corresponding URL and output the sorting result to the output device 50 which is a display or a file are the same as those of the first embodiment.

Figure 7:
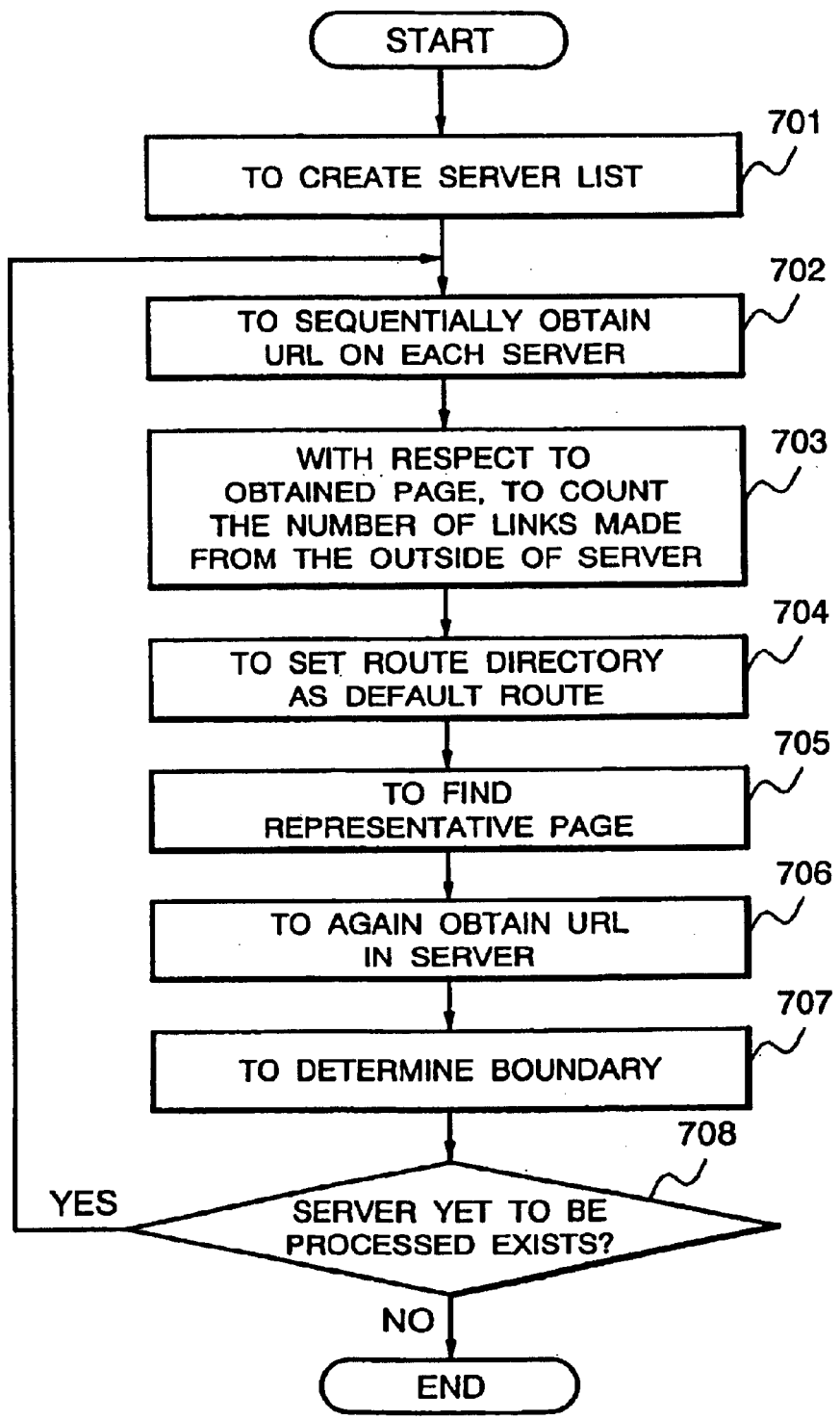
FIG. 7 is a flow chart for use in explaining processing of determining an importance according to the second embodiment of the present invention.

FIG. 7 is a flow chart for use in explaining outlines of importance determination processing of the second embodiment.

With reference to FIG. 7, first, the page analysis unit 21 creates a list of servers which hold pages stored in the page information management unit 11 and registers the same in the server list holding unit 25-1 of the representative page determination unit 25 (Step 701).

Next, the member URL obtaining unit 25-2 of the representative page determining unit 25 takes out one server from the server list holding unit 25-1, obtains a list of URLs on the server from the page information management unit 11 and registers the list in the temporary work region 25-3 (Step 702).

Then, with respect to each URL on a server stored in the temporary work region 25-3, count the number of link references from the outside of the server by means of the link analysis unit 22 (Step 703).

The representative page selection unit 25-5 of the representative page determination unit 25 sets a route directory of the server as a default route (Step 704) to execute the processing of finding a representative page (Step 705). In a case, for example, of URL with "http//www.nec.co.jp:80/DIRa/DIRb/index.html", "www.nec.co.jp" indicates a host, "www.nec.co.jp:80" indicates a server, the subsequent "/" indicates a route directory, "DIRa" indicates a sub-directory immediately under the route and "DIRb" indicates a sub-directory immediately under DIRa. In addition, "index.html" indicates a file name constituting a substance of a page. In this case, "/" is set as a default route.

Subsequently, again obtain URL in the server (Step 706) to set a boundary (Step 707). Here, the boundary indicates, as described above, conditions of the application as a member for a certain information set made up of a representative page and its member pages.

The foregoing processing from Step 702 to Step 707 will be executed for all the servers (Step 708).

Figure 8:
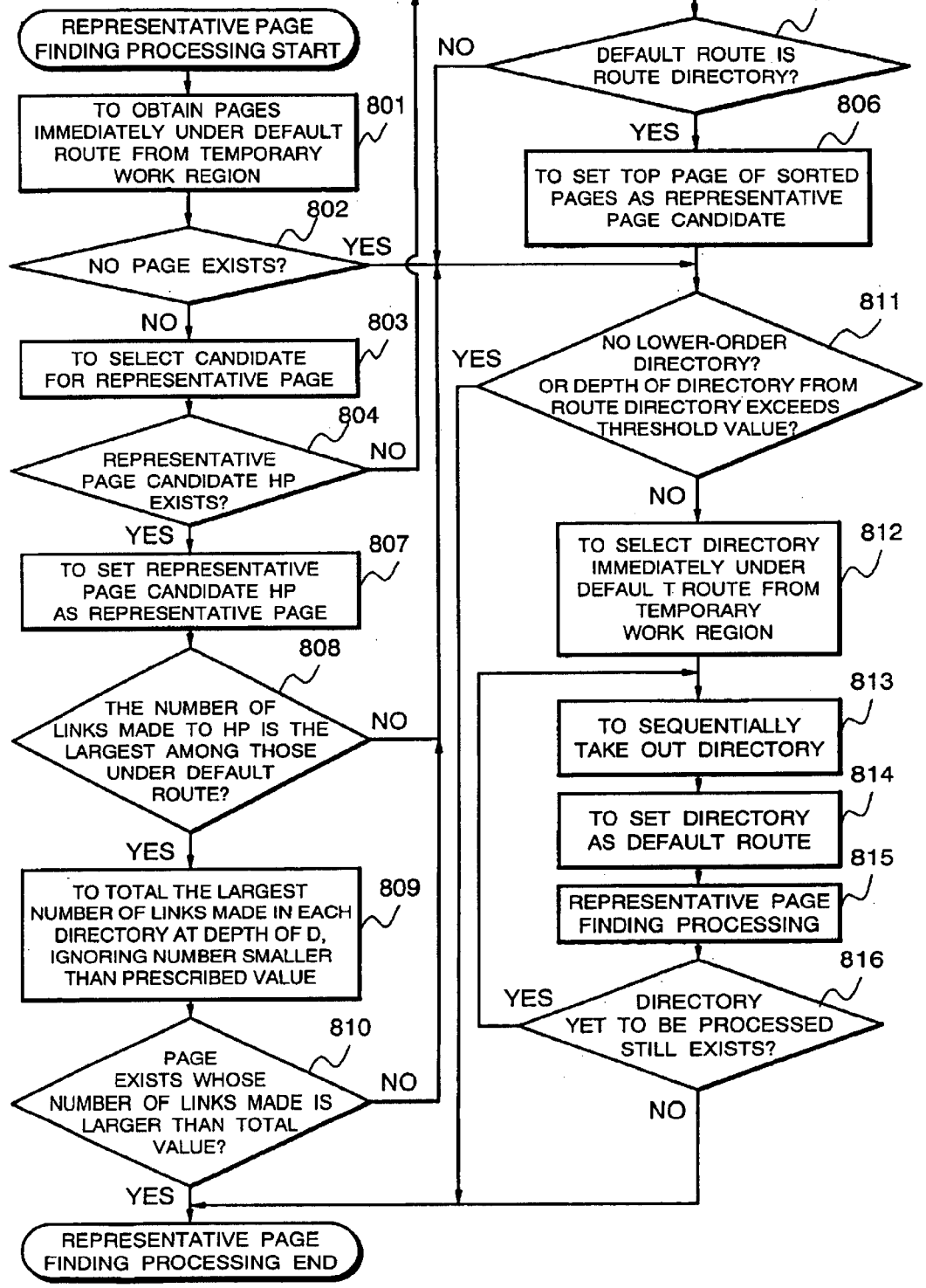
FIG. 8 is a flow chart for use in explaining processing of finding a representative page according to the second embodiment of the present invention.

Next, processing of finding a representative page (Step 705) will be described in detail. FIG. 8 is a flow chart for use in explaining the processing of finding a representative page according to the second embodiment.

With reference to FIG. 8, the representative page selection unit 25-6 obtains URLs under a given default route from the temporary work region 25-3 by means of the directory cut-out unit 25-5 (Step 801). Here, if no URL exists, the routine proceeds to Step 811 (Step 802).

Here, when a URL exists and it is obtained, the representative page selection unit 25-6 conducts processing of selecting a candidate for a representative page with respect to the obtained URL (Step 803).

In the selection of a representative page candidate (Step 803), when a candidate for a representative page is found (Step 804), register the candidate as a representative page in the information set management unit 13 through the representative page registration unit 25-9 (Step 807).

When no representative page candidate is found, if the default route is a route directory of the server (Step 805), sort the pages obtained at Step 801 and register its top page in the representative page registration unit 25-9 (Step 806). When the default route is not a route directory of the server at Step 805, the routine proceeds to Step 811.

Furthermore, the representative page selection unit 25-6 compares the number of links of the page registered as the representative page at Step 807 made from the outside of the server with the number of links of every page under the default route made from the outside of the server and when the number of links made to the representative page is the largest among the numbers of links made to pages under the default route, the routine proceeds to Step 809 and otherwise the routine proceeds to Step 811 (Step 808).

Next, when the number of links made to the representative page is the largest among the numbers of links made to pages under the default route at Step 808, the representative page determination unit 25-6 cuts out a sub-directory immediately under the default route by means of the directory cut-out unit 25-5, and further obtains a page whose number of links made from the outside of the server is the largest within an individual sub-directory and totals the numbers of links to calculate a total value (Step 809). When the largest number of links made in each sub-directory is smaller than a prescribed value, the number is not added.

Here, compare the calculated total value and the number of links made to the representative page (Step 810) and when the total value is smaller, proceed to Step 811 and otherwise end the representative page finding processing.

Next, the representative page selection unit 25-6 checks whether a sub-directory exists immediately under the default route by means of the directory cut-out unit 25-5 (Step 811). When no sub-directory exists or when a depth of a sub-directory from the route directory exceeds a set value, end home page finding processing. Otherwise, select a directory D immediately under the default route from the temporary work region 25-3 (Step 812), and the representative page determination unit 25-6 sequentially takes out a sub-directory from the directory cut-out unit 25-5 (Step 813) and again sets the sub-directory as a default route (Step 814) to recursively execute the representative page finding processing (Step 815). Until all the sub-directories are processed, repeat the Steps 813 through 815 (Step 816) and when completed, end the representative page determination processing.

Figure 9:
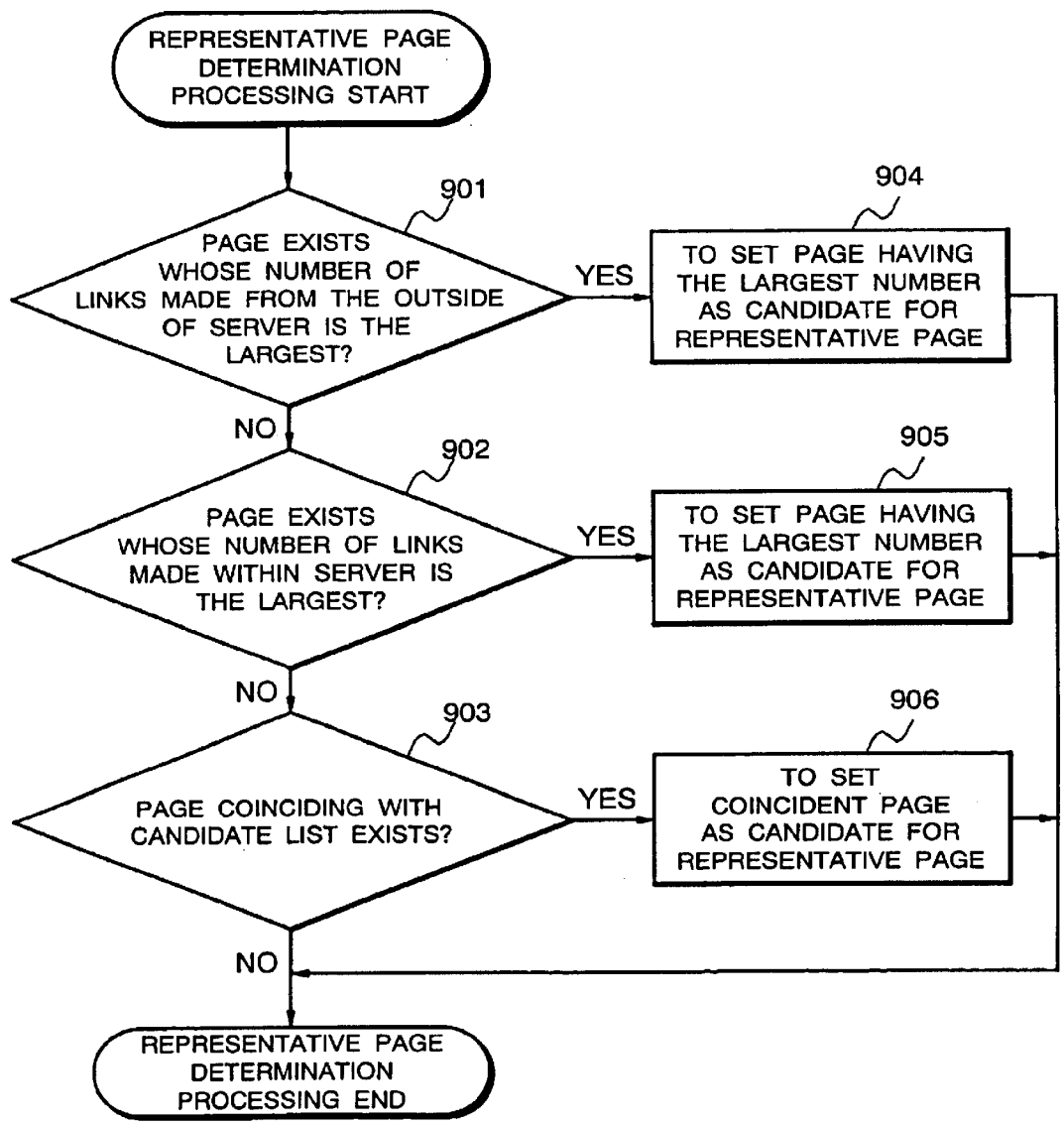
FIG. 9 is a flow chart for use in explaining processing of selecting a candidate for a representative page according to the second embodiment of the present invention.

FIG. 9 is a flow chart for use in explaining the processing of selecting a representative page candidate (Step 803) of the second embodiment.

With reference to FIG. 9, in the processing of selecting a candidate for a representative page, the representative page selection unit 25-6 checks with respect to a URL set applied by the directory cut-off unit 25-5 whether a page exists whose number of links made from the outside of the server is the largest (Step 901) and if such a page exists, sets the page as a candidate for a representative page (Step 904). When a page whose number of links made is the largest is found in the plural at Step 901, for these plurality of pages whose number of links made is the largest, count the number of link references made within the server and evaluate the number by means of the number of links made within server counting unit 25-7 (Step 902) and set a page whose number of links made from the outside of the server is the largest and whose number of links made within the server is the largest as a candidate for a representative page (Step 905). When a page coinciding with the conditions of Step 902 is found in the plural, compare file names of these pages with the file names stored in the candidate name for representative storage unit 25-8 (Step 903) and when the file names coincide with each other, set the relevant page as a candidate for a representative page (Step 906).

Figure 10:
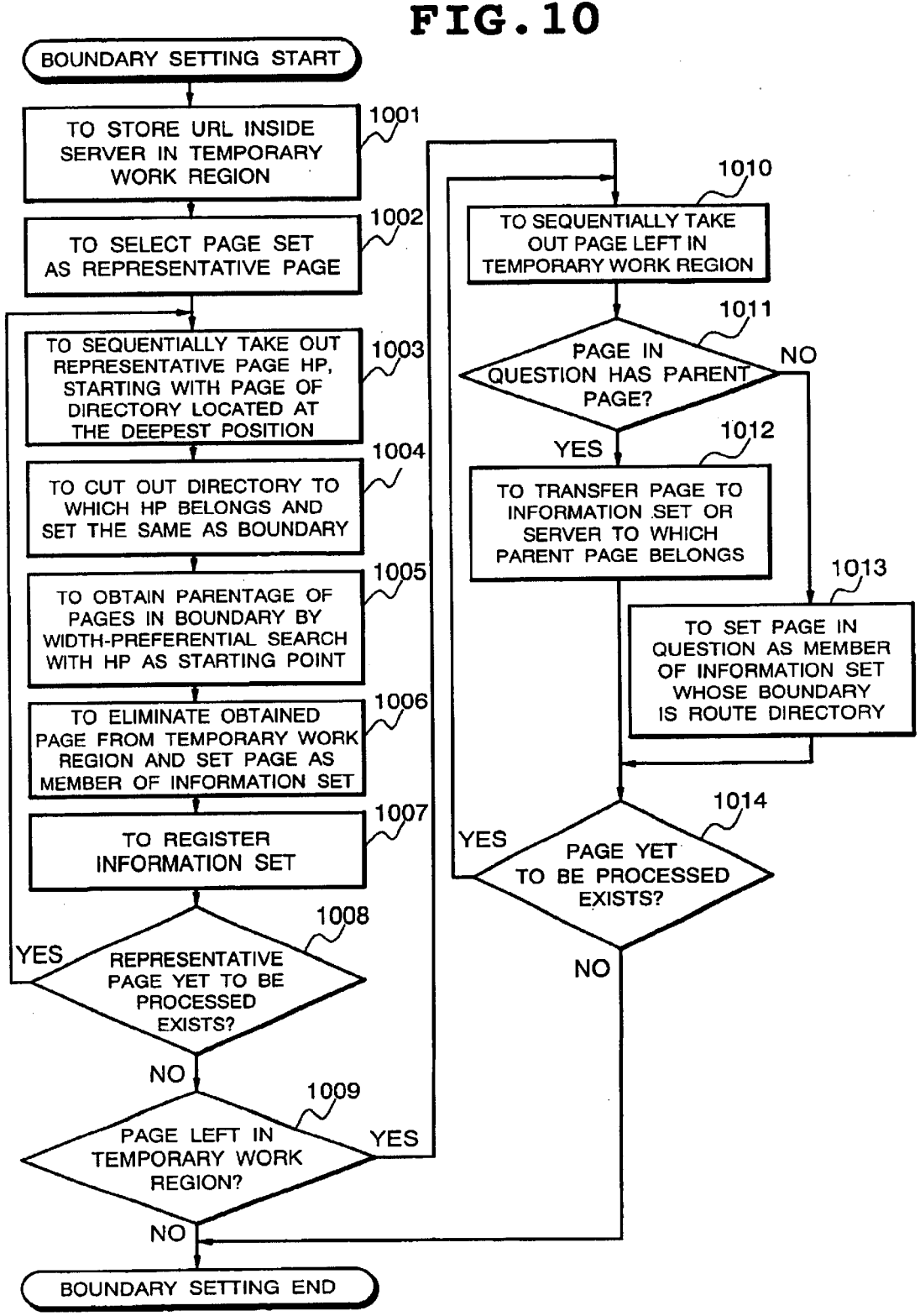
FIG. 10 is a flow chart for use in explaining processing of determining a boundary according to the second embodiment of the present invention.

Next, boundary determination processing will be described in detail with reference to the drawing. FIG. 10 is a flow chart for use in explaining the processing of determining a boundary according to the second embodiment.

With reference to FIG. 10, in the boundary determination processing, first, the URL list generation unit 24-1 of the information set determination unit 24 takes out a list of URLs inside server from the page information management unit 11 and stores the same in the temporary work region 24-2 (Step 1001). The representative page selection unit 24-3 selects a URL of a page set as a representative page from among the URLs stored in the temporary work region 24-2 (Step 1002) and sequentially takes out the representative pages, starting with a page of the directory located at the deepest position (Step 1003).

The boundary determination unit 24-4 cuts out a directory to which the representative page belongs and registers the same as a boundary in the information set generation unit 24-7 (Step 1004). The parentage search unit 24-5 conducts width-preferential search for a page existing in the directory set as a boundary with the representative page as a starting point (Step 1005), registers a URL list obtained by the search as a member (page) of an information set in the information set generation unit 24-7 and eliminates the same from the temporary work region 24-2 (Step 1006). The information set generation unit 24-7 sets the boundary and the member registered by the above processing at the information set management unit 13 (Step 1007).

With respect to all the representative pages in the server, repeat the processing of finding a boundary and a member (Steps 1003 to 1007) (Step 1008).

After executing the boundary and member finding processing with respect to all the representative pages in the server, the representative page selection unit 24-3 checks whether a URL is left in the temporary work region 24-2 (Step 1009). If no URL is left, end the present boundary determination processing. If it is left, sequentially take out URLs (Step 1010) to check whether it has a parent page or not (Step 1011).

When the URL taken out from the temporary work region 24-2 has a parent page, the other set transfer unit 24-6 registers, in the information set management unit 13, the URL in question as a member of an information set (or server in a case where the set is yet to be defined) to which the parent page belongs (Step 1012). When the URL has no parent page, the other set transfer unit 24-6 registers the URL in question as a member of an information set whose boundary is a route directory in the server to which the URL in question belongs (Step 1013).

After executing the foregoing processing of Steps 1010 to 1013 for all the URLs left in the temporary work region 24-2, finish the present boundary determination processing.

Figure 11:
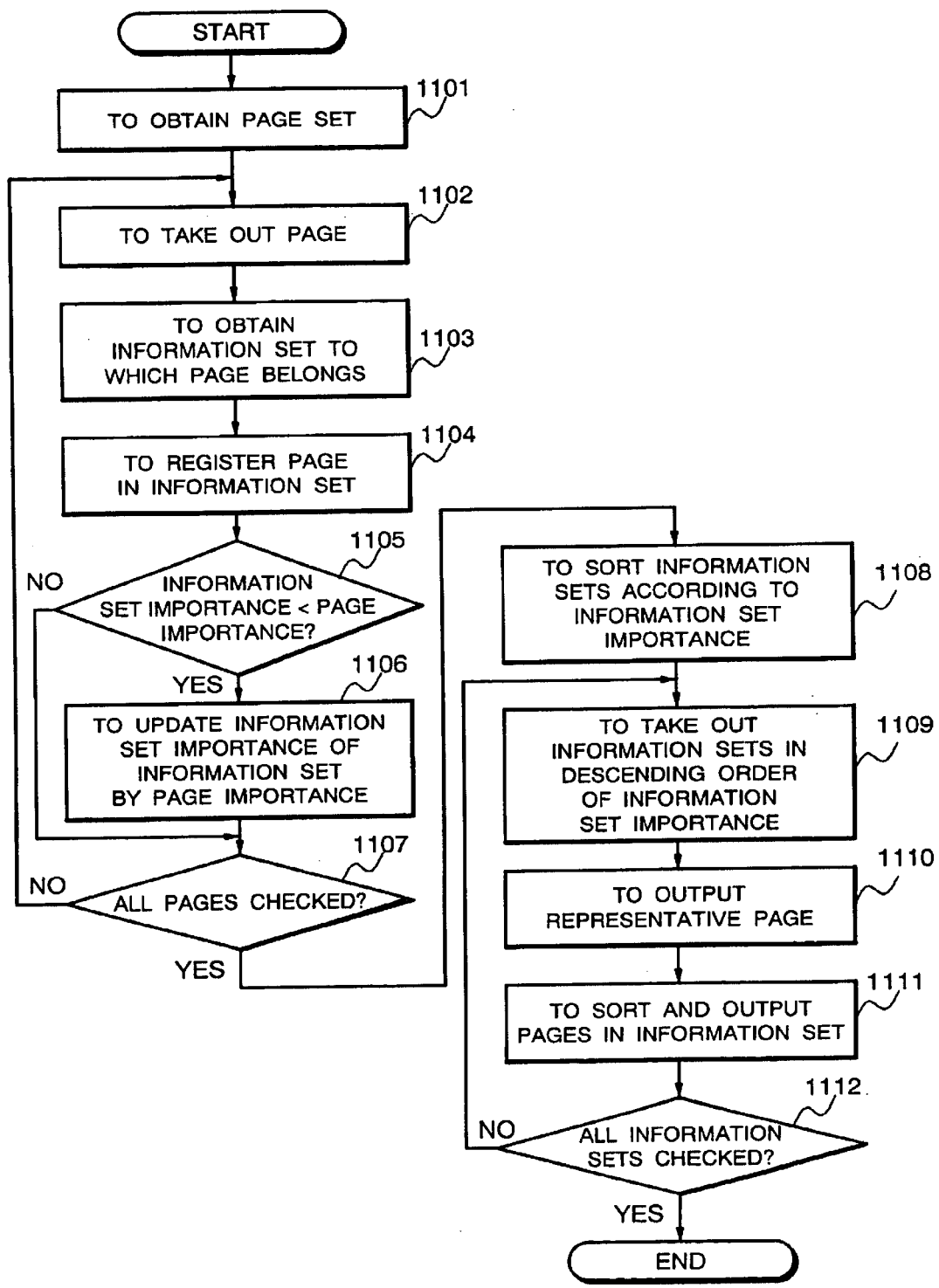
FIG. 11 is a flow chart for use in explaining page set sorting processing according to the second embodiment of the present invention.

Processing of sorting a page set will be described in detail with reference to the drawing. FIG. 11 is a flow chart for use in explaining the page set sorting processing of the second embodiment.

With reference to FIG. 11, in the page set sorting processing, first, the page set obtaining unit 23-1 of the page set sorting unit 23 obtains a URL list applied from the input device 40 and stores the same in the data storage unit 23-2 (Step 1101).

Next, the information set obtaining unit 23-3 sequentially takes out URLs from the data storage region 23-2 (Step 1102) and obtains an information set to which the URL in question belongs from the information set management unit 13 (Step 1103) to register the URL in question as a member of the information set in question in the data storage region 23-2 (Step 1104).

Here, compare a page importance that the page in question has and an information set importance that the information set in question has (Step 1105) and when the page importance is higher than the information set importance, set the page importance as the information set importance (Step 1106). Here, an importance of an information set can be set by various methods based on an importance of a page belonging to the information set. For example, among importance of pages belonging to the information set, the highest importance may be set as an importance of the information set. It is also possible to set a total of importance of the respective pages belonging to the information set as an importance of the information set.

Execute the above processing of Step 1102 to Step 1106 for all the URLs in the data storage region 23-2 (Step 1107).

Next, the sorting unit 23-5 sorts the information sets stored in the data storage region 23-2 according to their information set importance (Step 1108) to sequentially take out the information sets in descending order of information set importance (Step 1109).

The representative page obtaining unit 23-4 takes out a representative page of the information set in question from the information set management unit 13 and outputs the same to the output device 50 (Step 1110) and subsequently the sorting unit 23-5 outputs pages in the information set to the output device 50 in the order of sorting (Step 1111).

Repeat the processing of Step 1109 to Step 1111 to output all the information sets in the data storage region 23-2 to the output device 50 (Step 1112).

In the first embodiment, determination of proximity between a link source URL and a link destination URL is made at Step 206 based on whether they exist on the same server or not. In addition, only a page set applied from the input device is to be sorted and output. On the other hand, in the second embodiment, the information set determination unit 24 determines a range of an information set based not only on a server but also on a directory and linkage and stores the obtained information set in the information set management unit 13. Furthermore, the representative page determination unit 25 determines a representative page of each information set. In addition, the page set sorting unit 23a not only sorts and outputs page sets on an information set basis but also applies a representative page of each information set.

Effects of the present embodiment will be described in the following.

Since the present embodiment includes a unit for determining a range of an information set by using a network address and linkage of each page, a unit for storing and managing a determined information set, a unit for determining a representative page of an information set and a unit for sorting page sets taking an information set into consideration, it can obtain a page importance whose precision is higher than a page importance obtained simply taking a difference in a server into consideration to the extent that has been attained by taking an information set into consideration. Accordingly, clustering of sorting results by using information sets improves visibility of a sorting result of a page set, and enables characteristics of an information set to which each page belongs to be comprehend with ease and further enables instantaneous access to a top page of a target information set.

Figure 12:
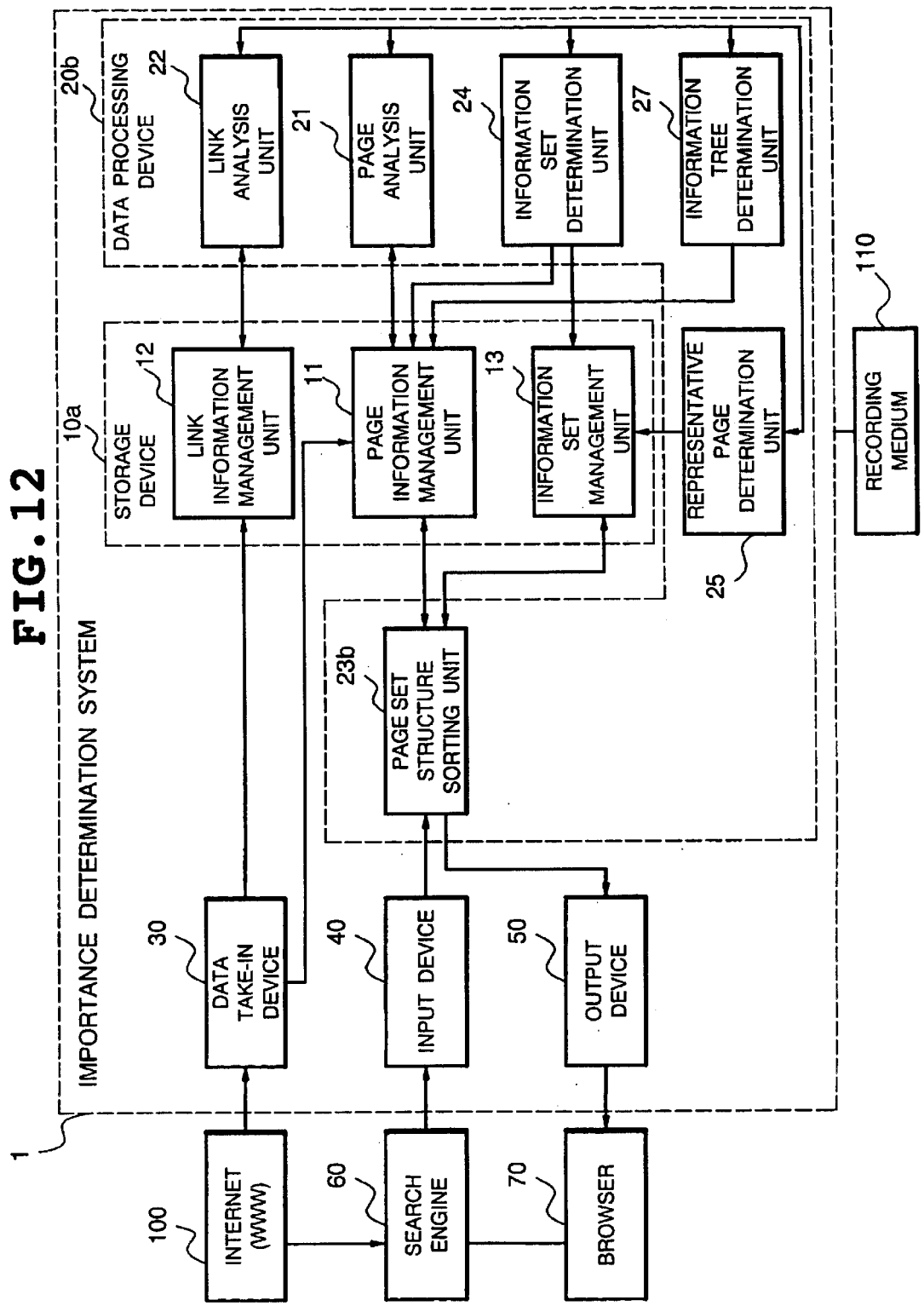
FIG. 12 is a block diagram showing a structure of an importance determination system according to a third embodiment of the present invention.

The third embodiment of the present invention will be described with reference to the drawings in detail. FIG. 12 is a block diagram showing a structure of an importance determination system 1 according to the third embodiment.

With reference to FIG. 12, the importance determination system of the third embodiment differs from that of the second embodiment shown in FIG. 3 in having in addition to the components of the data processing device 20 of the second embodiment, an information tree determination unit 27 and a page set sorting unit 23b which is an extension of the page set sorting unit 23a of the second embodiment is provided.

Figure 13:
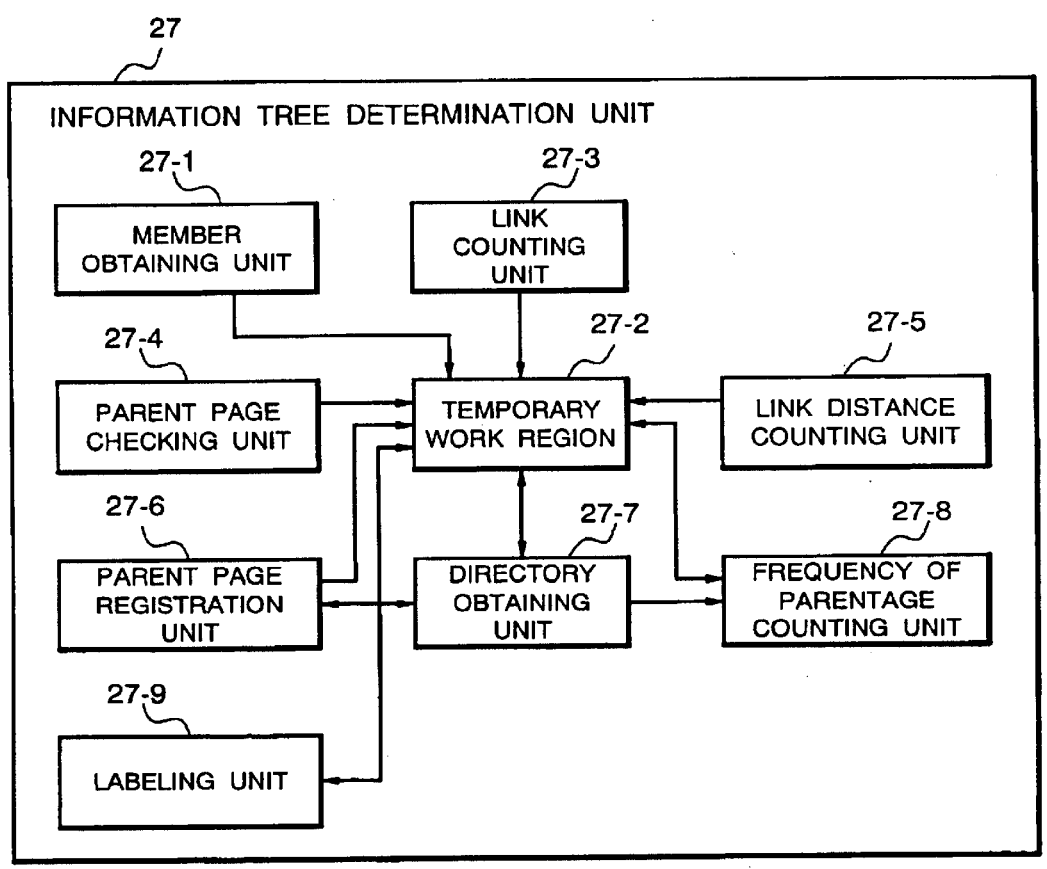
FIG. 13 is a block diagram showing a structure of an information tree determination unit according to the third embodiment of the present invention.

FIG. 13 is a block diagram showing a structure of the information tree determination unit 27 of the third embodiment of the present invention.

The information tree determination unit 27 determines an information tree structure targeting all the information sets stored in the information set management unit 13 by means of the page analysis unit 21 and the link analysis unit 22.

With reference to FIG. 13, the information tree determination unit 27 includes a member obtaining unit 27-1, a temporary work region 27-2, a link counting unit 27-3, a parent page checking unit 27-4, a link distance counting unit 27-5, a parent page registration unit 27-6, a directory obtaining unit 27-7, a frequency of parentage counting unit 27-8 and a labeling unit 27-9.

Figure 14:
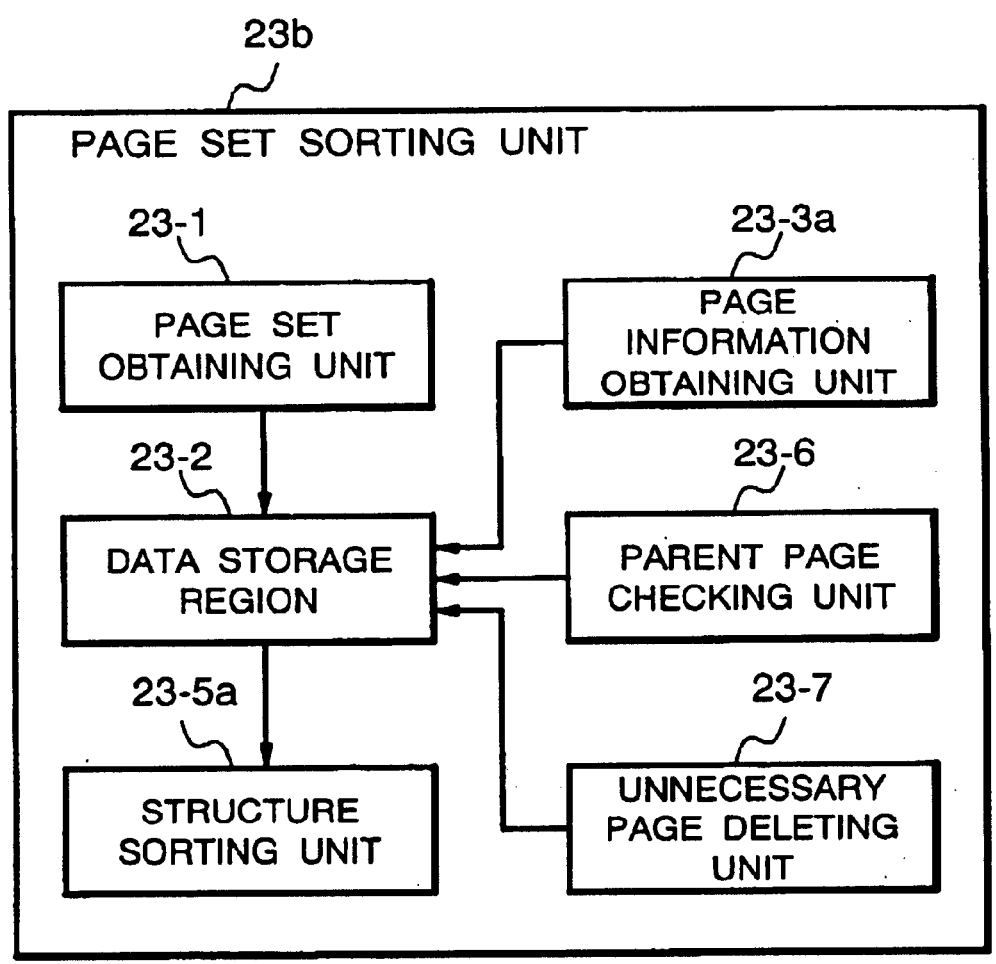
FIG. 14 is a block diagram showing a structure of a page set sorting unit according to the third embodiment of the present invention.

FIG. 14 is a block diagram showing a structure of the page set sorting unit 23b of the third embodiment.

The page set sorting unit 23b sorts page sets transferred through the input device 40 by using page importance stored in the page information management unit 11 and data of information sets stored in the information set management unit 13 and outputs the sorting results to the output device 50.

With reference to FIG. 14, the page set sorting unit 23b includes a page set obtaining unit 23-1, a data storage region 23-2, a page information obtaining unit 23-3a, a structure sorting unit 23-5a, a parent page checking unit 23-6 and an unnecessary page deleting unit 23-7.

Next, operation of the present embodiment will be described in detail with reference to FIGS. 15 to 22.

The processing conducted by the data take-in device 30 to register data in the page information management unit 11 and the link information management unit 12 is the same as that of the first embodiment, and the processing conducted by the representative page determination unit 25 to determine a representative page of each server by means of the page analysis unit 21 and the link analysis unit 22 and the processing conducted by the information set determination unit 24 to determine an information set by means of the page analysis unit 21 and the link analysis unit 22 and register the same in the information set management unit 13 are the same as those of the second embodiment.

Figure 15:
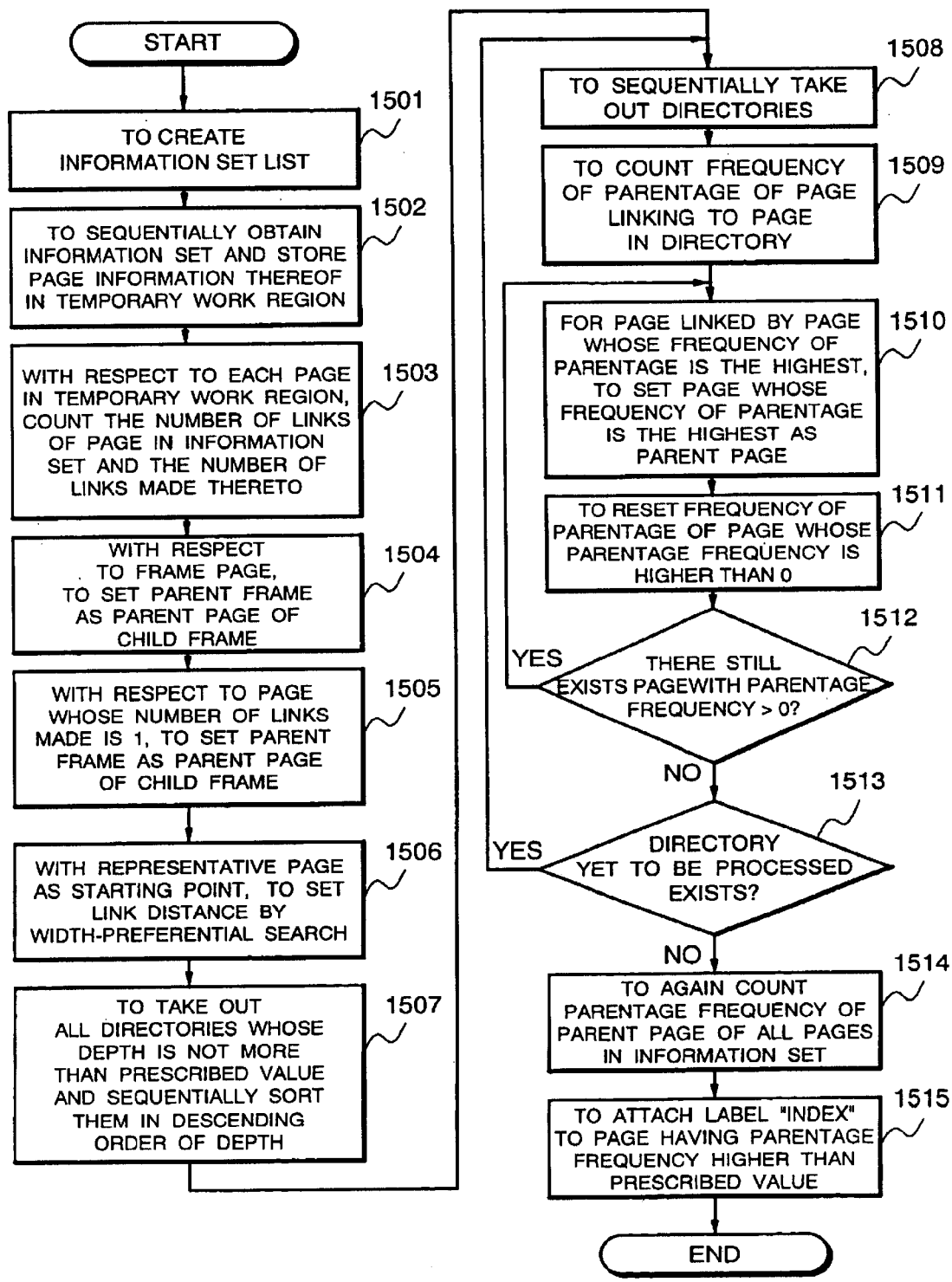
FIG. 15 is a flow chart for use in explaining processing of determining an information tree according to the third embodiment of the present invention.

Detailed description will be made of processing of determining an information tree of each information set conducted after the determination of a representative page and an information set with reference to the drawing. FIG. 15 is a flow chart for use in explaining the processing of determining an information tree conducted by the information tree determination unit 27.

With reference to FIG. 15, first, the member obtaining unit 27-1 of the information tree determination unit 27 creates a list of information sets from the information set management unit 13 (Step 1501), sequentially obtains information sets from the list, obtains a member URL of the information set in question from the information set management unit 13 and stores the same in the temporary work region 27-2 (Step 1502).

With respect to all the member URLs of the information set stored in the temporary work region 27-2, the link distance counting unit 27-3 counts the number of links made to each URL among member URLs by means of the link analysis unit 22 (Step 1503).

The parent page checking unit 27-4 checks whether each of all the member URLs stored in the temporary work region 27-2 is a frame page or not by means of the page management unit 11 and when the URL is a frame page, obtains a URL of a page (child page) contained in the frame page in question by means of the link management unit 12. The parent page registration unit 27-6 sets a parent page URL as a parent of the child page URL and registers the same in the page management unit 11 (Step 1504).

Then, the parent page checking unit 27-4 selects a URL whose number of links made among the member URLs set at Step 1503 is "1" and the parent page registration unit 27-6 sets the URL of the link source page as a parent and registers the same in the page management unit 11 (Step 1505).

Next, the link distance counting unit 27-5 checks parentage between the respective member URLs by width-preferential search with a representative page as a starting point, calculates a link distance from the representative page and sets the link distance at the temporary work region 27-2 (Step 1506).

The directory obtaining unit 27-7 takes out a directory in a server to which a member URL stored in the temporary work region 27-2 belongs and sequentially sorts directories in descending order of directory, assuming that directory whose depth is not less than a prescribed value will not be taken out (Step 1507).

Then, the directory obtaining unit 27-7 takes out the obtained directories in descending order of depth and notifies the frequency of parentage counting unit 27-8 of the directories (Step 1508).

Next, the frequency of parentage counting unit 27-8 obtains a URL of a page (candidate for parent page) linking to a member URL belonging to the directory in question by means of the link management unit 12, counts the number of links made from each candidate for parent page to a page belonging to the directory in question and takes the obtained number of links as a frequency of parentage of the candidate parent page (Step 1509).

The parent page checking unit 27-4 selects a page whose frequency of parentage is the highest from among candidates for a parent page as a parent page and the parent page registration unit 27-6 sets the parent page as a parent of a member URL linked by the parent page and registers the parent page in the page information management unit 11 (Step 1510).

Next, reset the frequency of parentage of the page set as a parent page (Step 1511) and execute the processing of Steps 1510 to 1511 for all the pages having a frequency of parentage (Step 1512).

Furthermore, to all the directories cut out at Step 1507, execute the processing of Steps 1508 to 1512 (Step 1513).

Next, the frequency of parentage counting unit 27-8 here resets a frequency of parentage of all the member URLs once and counts a frequency of parentage of each member URL based on parentage of a member URL obtained by the processing up to Step 1513 (Step 1514).

The labeling unit 27-9 attaches a label unitarily identifiable such as "INDEX" to a member URL having a frequency of parentage higher than a prescribed threshold value and registers the label in the page information management unit 12 (Step 1515).

Next, page set sorting processing will be described in detail with reference to the drawing.

Figure 16:
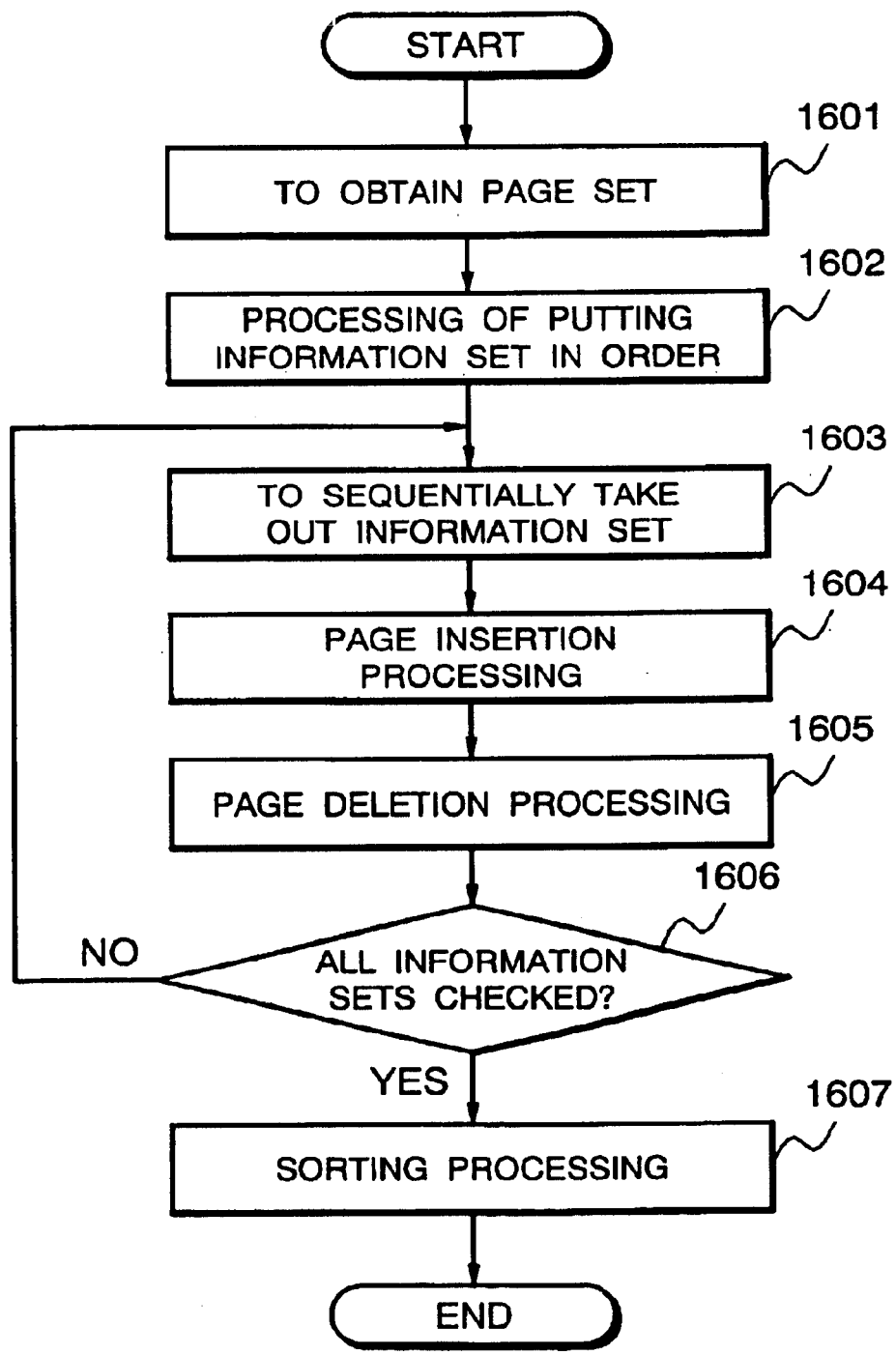
FIG. 16 is a flow chart for use in explaining page set sorting processing according to the third embodiment of the present invention.

FIG. 16 is a flow chart for use in explaining the processing of sorting page sets by the page set sorting unit 23b according to the third embodiment.

With reference to FIG. 16, the page set obtaining unit 23-1 obtains a URL list (page set) applied from the input device 40 and stores the same in the data storage region 23-2 (Step 1601).

Subsequently, execute processing of putting information sets in order (Step 1602).

When the processing of putting information sets in order is completed, the parent page checking unit 23-6 sequentially updates a pointer indicating an information set in the data storage region 23-2 (Step 1603) to execute page insertion processing (Step 1604).

When the page insertion processing is completed, the unnecessary page deleting unit 23-7 takes out an information set designated at Step 1603 to execute page deletion processing (Step 1605).

Execute the foregoing processing of Steps 1603 to 1605 for all the information sets (Step 1606).

Lastly, the structure sorting unit 23-5a executes structure sorting processing (Step 1607).

Figure 17:
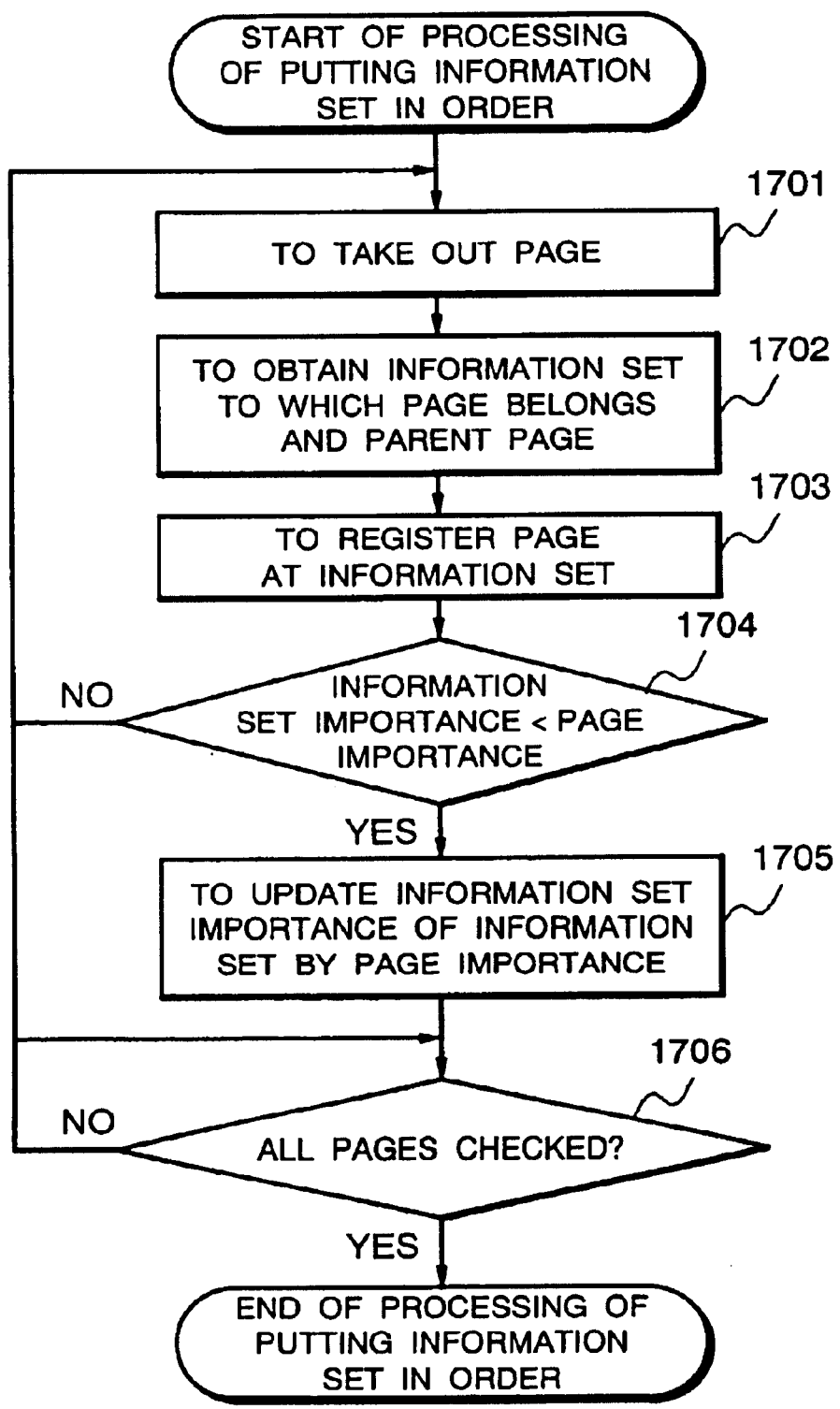
FIG. 17 is a flow chart for use in explaining processing of putting an information set in order according to the third embodiment of the present invention.

The processing of putting information sets in order (Step 1602) will be described in detail with reference to the drawing. FIG. 17 is a flow chart for use in explaining the processing of putting information sets in order according to the third embodiment.

With reference to FIG. 17, the processing of putting information sets in order of the third embodiment is executed in the following manner. That is, the page information obtaining unit 23-3a sequentially takes out a URL (page) from the data storage region 23-2 (Step 1701), obtains an information set to which the URL in question belongs and its parent page URL from the page information management unit 11 (Step 1702) and registers the URL in question as a member of the information set in question at the data storage region 23-2 (Step 1703).

Next, compare a page importance that the page in question has and an information set importance that the information set in question has (Step 1704). When the page importance is higher than the information set importance, set the page importance as the information set importance (Step 1705).

Execute the foregoing processing of Steps 1701 to 1705 for all the URLs in the data storage region 23-2 (Step 1706).

Figure 18:
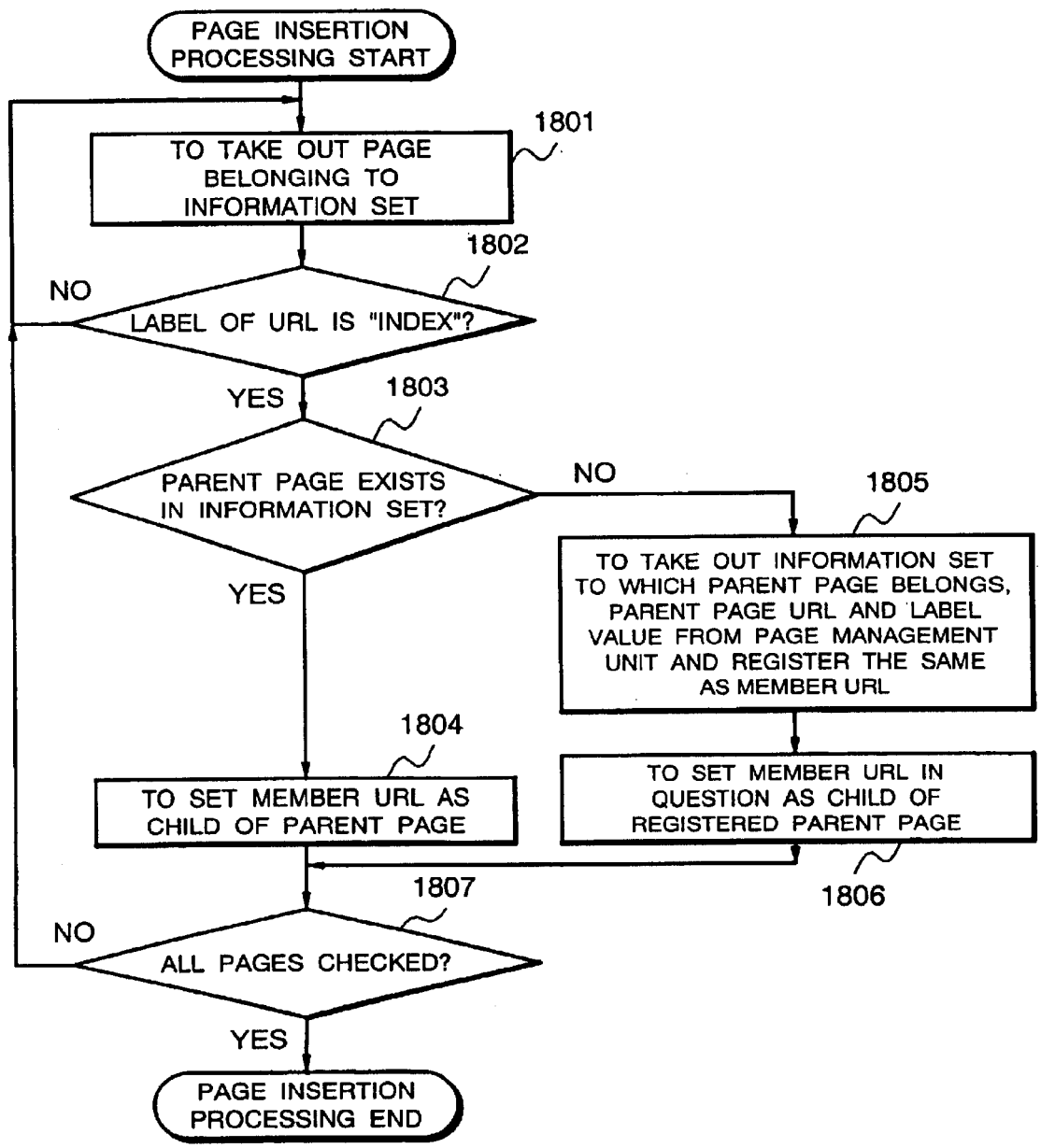
FIG. 18 is a flow chart for use in explaining page inserting processing according to the third embodiment of the present invention.

The page insertion processing (Step 1604) will be described in detail with reference to the drawing. FIG. 18 is a flow chart for use in explaining the page insertion processing according to the third embodiment.

With reference to FIG. 18, the page insertion processing is executed in the following manner. That is, the parent page obtaining unit 23-6 sequentially takes out member URLs contained in the information set designated at Step 1603 from the data storage region 23-2 (Step 1801) and checks whether a label of the member URL is "INDEX" or not (Step 1802).

When the label is not "INDEX", return to Step 1801 to sequentially take out subsequent member URLs.

When the label is "INDEX", check whether a parent page URL of the member URL in question exists as a member URL of the information set in question in the data storage region 23-2 (Step 1803).

When the parent page URL exists, set the member URL in question as a child of the parent page URL in question (Step 1804).

When the parent page URL fails to exist, the page information obtaining unit 23-3a takes out an information set to which a parent page of the member URL in question belongs, a parent page URL and a label value from the page information management unit 11 and registers the same as a member URL in the data storage region 23-2 (Step 1805). Furthermore, set the member URL in question as a child of the registered parent page URL (Step 1806).

The parent page checking unit 23-6 executes the above Steps 1801 to 1805 for all the member URLs contained in the information set in question (Step 1807).

Figure 19:
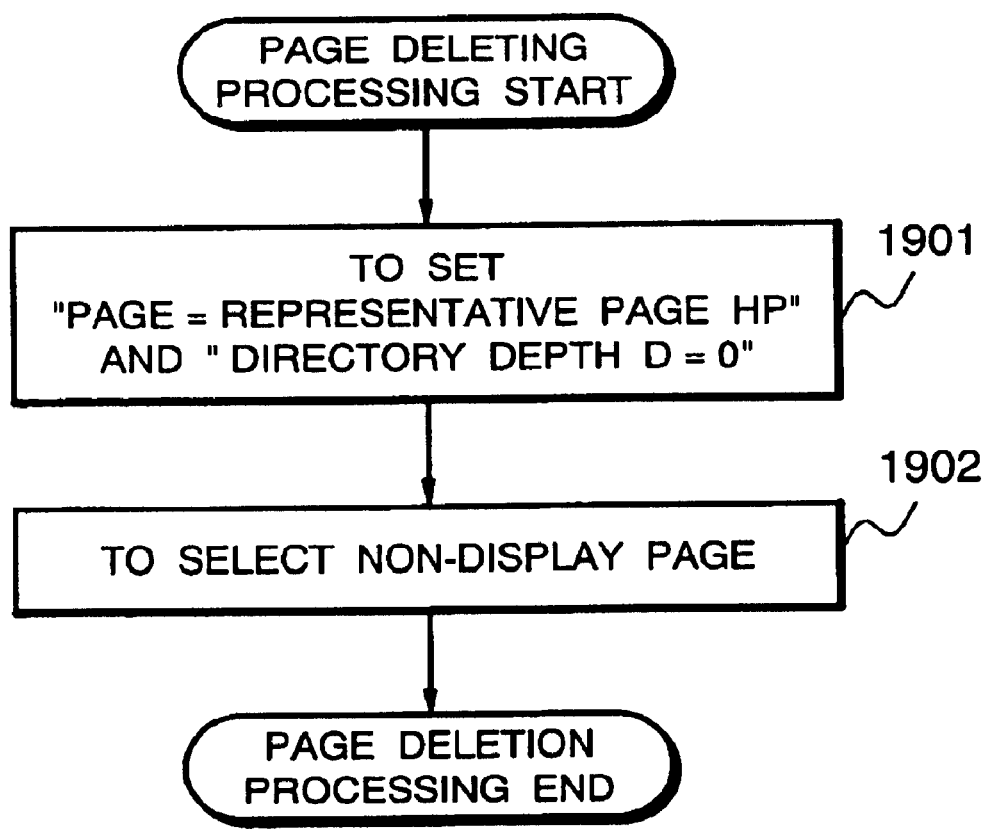
FIG. 19 is a flow chart for use in explaining processing of deleting unnecessary pages according to the third embodiment of the present invention.

The unnecessary page deleting processing (Step 1605) will be described in detail with the reference to the drawing. FIG. 19 is a flow chart for use in explaining the unnecessary page deleting processing according to the third embodiment.

With reference to FIG. 19, the unnecessary page deleting processing of the third embodiment is executed in the following manner. That is, the unnecessary page deleting unit 23-7 takes out a representative page of the information set designated at Step 1603 from the data storage region 23-2 and sets the same as a URL to be processed, and furthermore sets a depth d of a directory to which the representative page belongs as d=0 (Step 1901).

Next, execute processing of selecting a non-display page (Step 1902). Here, in a flow of the non-display page selection processing, recursive processing is conducted in which display page selection processing is again executed for a child page during processing.

Figure 20:
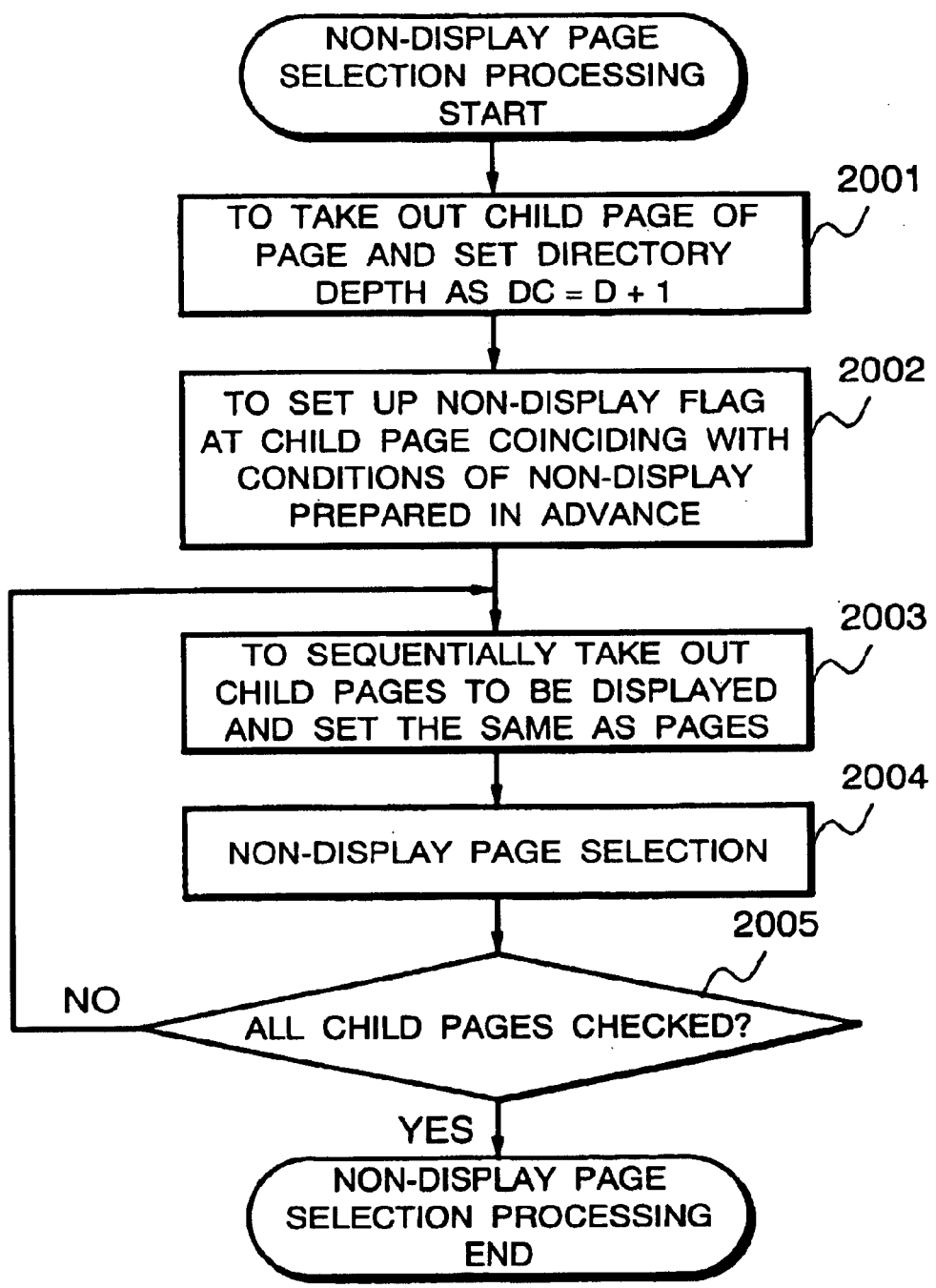
FIG. 20 is a flow chart for use in explaining processing of selecting pages not to be displayed according to the third embodiment of the present invention.

The non-display page selection processing (Step 1902) will be described in detail with reference to the drawing. FIG. 20 is a flow chart for use in explaining the non-display page selection processing.

With reference to FIG. 20, the non-display page selection processing is executed in the following manner. The unnecessary page deleting unit 23-7 takes out child pages of the URL to be processed in question from the data storage region 23-2 and sets a directory depth dc of these child pages as dc=d+1 (Step 2001).

Compare the child pages in question and conditions of non-display prepared in advance and set up a non-display flag at a child page coinciding with the conditions (Step 2002). The non-display conditions are assumed to be arbitrarily set.

From among the child pages in question, select those not having non-display flag, sequentially take out page URLs therefrom (Step 2003) and recursively execute the non-display page selection processing for the child pages (Step 2004).

For all the child pages selected at Step 2003, execute the processing of Step 2003 and Step 2004 (Step 2005).

Figure 21:
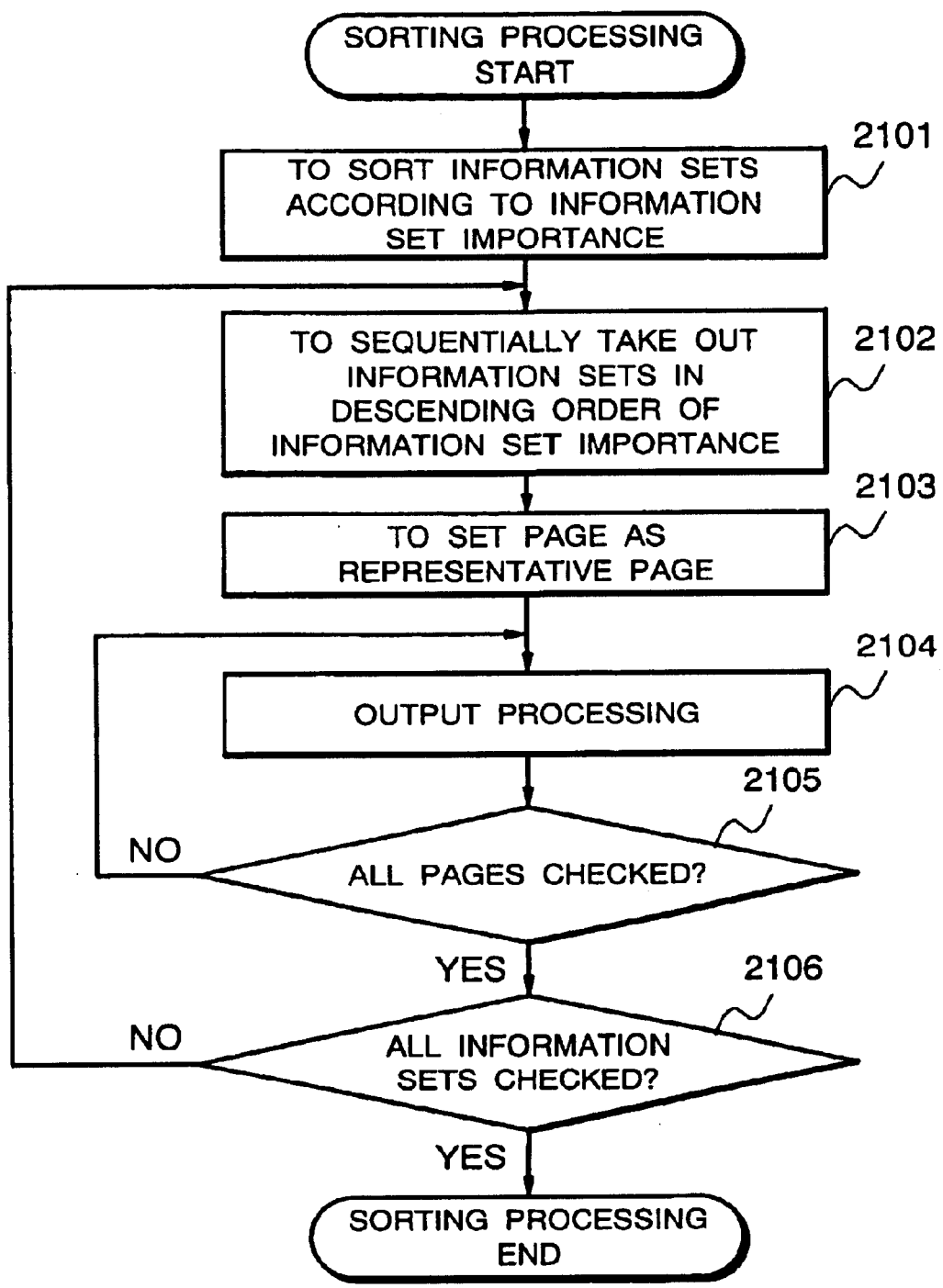
FIG. 21 is a flow chart for use in explaining structure sorting processing according to the third embodiment of the present invention.

Next, the structure sorting processing (Step 2005) will be described in detail with reference to the drawing. FIG. 21 is a flow chart for use in explaining the structure sorting processing.

With reference to FIG. 21, the structure sorting processing of the third embodiment is executed in the following manner. The structure sorting unit 23-5a sorts information sets stored in the data storage region 23-2 according to information set importance (Step 2101) and sequentially takes out the information sets in descending order of the information set importance (Step 2102).

Next, select a representative page of the information set in question and set the same as a page to be processed (Step 2103).

Then, recursively execute output processing with the page to be processed URL as an argument (Steps 2104 to 2106).

Figure 22:
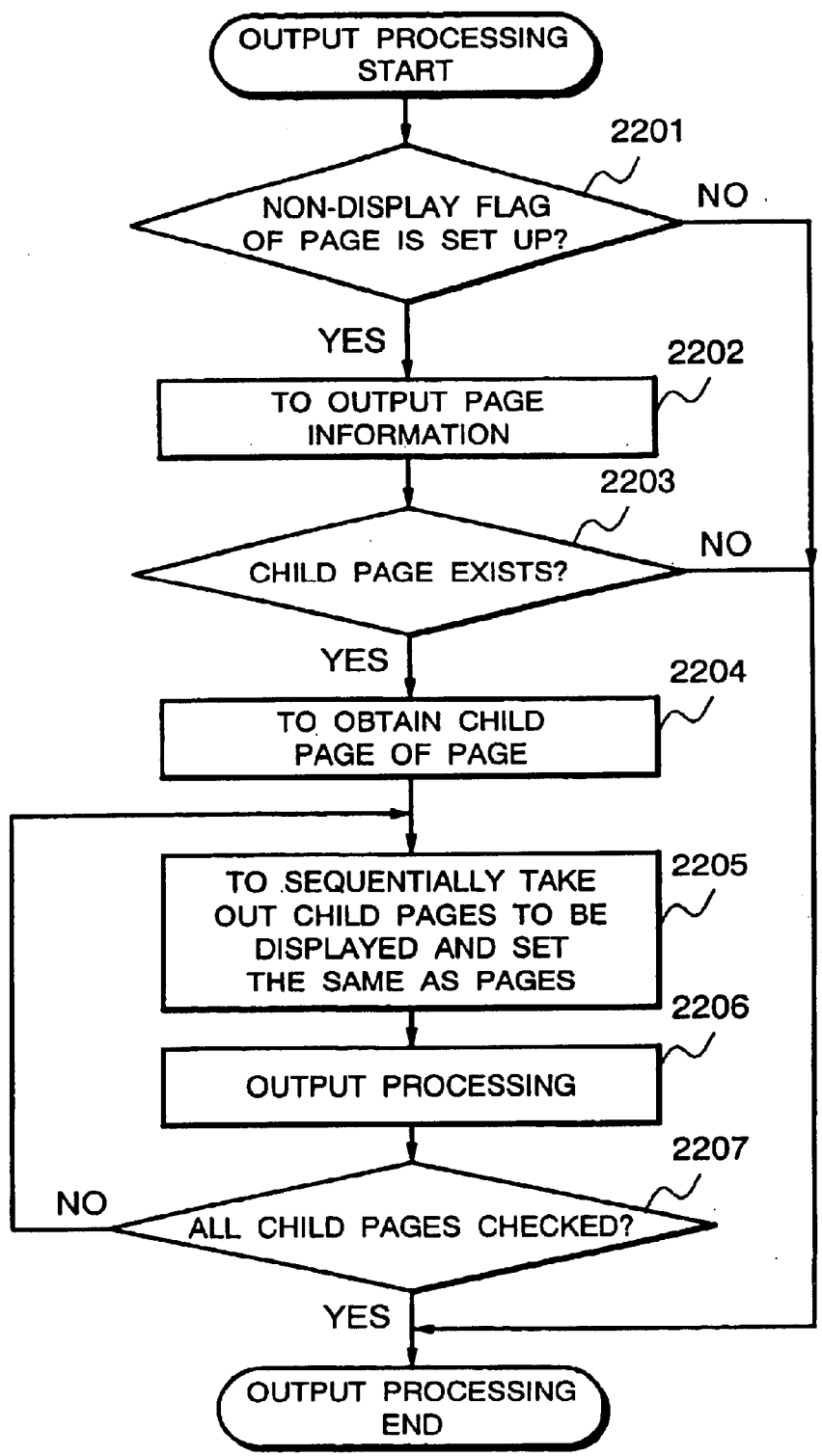
FIG. 22 is a flow chart for use in explaining output processing according to the third embodiment of the present invention.

The output processing (Step 2104) will be described in detail with reference to the drawing. FIG. 22 is a flow chart for use in explaining the output processing according to the third embodiment of the present invention.

With reference to FIG. 22, the output processing of the third embodiment is executed in the following manner. First, check whether a non-display flag of the page to be processed URL handed as an argument is set up (Step 2201).

When the non-display flag is set up, end the output processing without outputting the relevant page to be processed URL.

When the non-display flag is not set up, output the page information to the output device 50 (Step 2202) to check whether a child page exists in the page to be processed URL in question (Step 2203).

When the URL in question has no child page, end the output processing because the child page will not be output.

When the URL in question has a child page, obtain child page URLs (Step 2204) and sequentially take out these child page URLs (Step 2205) to execute the output processing (Step 2206).

For all the child pages obtained at Step 2204, execute the output processing of Steps 2205 and 2206 (Step 2207) to finish the output processing.

In the second embodiment, determination is made only of a representative page and a boundary of an information set and the sorting processing of a page set applied from the input device is conducted taking an importance and a representative page of the information set into consideration. On the other hand, in the third embodiment, the information tree determination unit 27 determines a structure of an information set based on a directory and linkage and stores the same in the page information management unit 11.

Moreover, the page set sorting unit 23b sorts page sets on an information set basis and not only outputs the information sets with a representative page applied thereto but also adds a necessary page and deletes an unnecessary page taking a structure of each information set into consideration.

Next, effects of the present embodiments will be described.

Since the present embodiment includes a unit for determining a range of an information set by using a network address and linkage of each page, a unit for storing and managing an information set determined, a unit for determining a representative page of an information set, a unit for determining an information tree structure in an information set and a unit for adding a necessary page and deleting an unnecessary page and sorting the pages taking an information set and an information tree structure into consideration, it can obtain a page importance whose precision is higher than that obtained simply taking a difference in server into consideration to the extent that has been attained by taking an information set into consideration, improve visibility of sorting results of page sets by clustering the sorting results using an information set, enables characteristics of an information set to which each page belongs to be comprehended with ease, enables instantaneous access to a top page of a target information set and furthermore enables presentation of only an important page by adding a necessary page even if it is not contained in the page set and deleting an unnecessary page.

The above-described information set importance determination system allows the functions of the data processing devices 20, 20a and 20b to be realized not only as hardware but also as software by an importance determination program for realizing each of the above-described functions which is recorded in a recording medium such as a magnetic disc or a semiconductor memory of a computer system. The importance determination program is read from the recording medium 110 illustrated in FIG. 1, FIG. 3 and FIG. 12 into the data processing device (CPU) of the computer system to control operation of the data processing devices, thereby realizing the above-described function of each unit to execute the importance determination processing.

The first effect of the above-described invention is sorting applied page lists in descending order of value for a user. As a result, page information required by a user is presented as high-order information to reduce labor for selecting information. The reason is that individual pages regarded as being of the same theme are grouped into one information set and a reference relationship among the information sets is counted.

The second effect is, when no appropriate representative page is contained in an applied page list, inserting the appropriate page and sorting the list. As a result, a representative page not conforming at the time of retrieval can be presented to a user. The reason is that a representative page of each information set is determined based on the state of references made from the outside of the information set or made within the information set and applied URL lists are grouped and sorted on an information set basis.

The third effect is deleting an unnecessary page from an applied page list. As a result, the number of retrieval results presented to a user can be reduced. The reason is that a page to be presented and a page not to be presented are selected using dependency among the respective pages in an information set.

What is claimed is:

1. An information set importance determination system, comprising:

page information management means for managing an attribute of page information constituting a hypermedia information, link information management means for holding and managing linkage between said page information, page information registration means for registering said hyper-media information in said page information management means and said link information management means, page analysis means for determining an importance of each said page, link analysis means for determining a weight of each link based on said link information, page set sorting means for sorting said page set based on said page importance of each said page, representative page determination means for determining a representative page of an information set, and means for collecting pages existing on each server from said hyper-media information on a network to obtain a link reference state of each said page over each said server, wherein an importance of each said page is determined using said link reference state, and a page set made up of a plurality of said pages is sorted based on said page importance of each said page, and the representative page determination means determines a page to be a representative page of the information set from among pages stored in the page information management means using the page analysis means and the link analysis means wherein said page set sorting means, when said representative page of an information set to which each said page belongs is not included in said page set applied from an input device, inserts said representative page into said page set, sorts said page set based on said information set and an importance of each page, and outputs sorting results to an output device, and said representative page determination means, when a plurality of pages exist whose said number of links from a page outside said information set is the largest, determines that a page whose said number of links from a page within said information set is the largest is a representative page of the information set, and further comprising:

information tree determination means for determining a main relationship of each page in said information set and setting a parent page of each said page and a role in said information set at said page management means, wherein said information tree determination means sequentially takes out an information set and a page as an element of the information set from said information set management means, with respect to all said pages taken out, counts the number of links from a page within said information set, sets a link source page of a page whose said number of links made is 1 as a parent page, sequentially takes out a sub-directory in ascending order of layer, checks a link source page linking a child page belonging to a sub-directory of said page, with respect to each said link source page, counts a frequency of parentage as the number of links to a page in a directory, starting with said link source page having the largest number of links among said link source pages, sequentially sets said link source page as a parent page of each child page linked to said link source page, and executes a series of the foregoing processing to all the pages to set a parent page.

2. The information set importance determination system as set forth in claim 1, further comprising:

information set management means for managing a range of an information set to which each said page belongs and said page as an element of the information set; and information set determination means for determining an information set to which each said page belongs, wherein said page set sorting means sorts said page set applied from an input device based on said information set and said importance of each page and outputs sorting results to an output device.

3. The information set importance determination system as set forth in claim 1, wherein said page set sorting means, when said representative page of an information set to which each said page belongs is not included in said page set applied from an input device, inserts said representative page into said page set, sorts said page set based on said information set and an importance of each page, and outputs sorting results to an output device.

4. The information set importance determination system as set forth in claim 1, wherein said representative page determination means checks the number of links to each page in said information set from a page outside said information set and determines that a page whose said number of links is the largest is a representative page of the information set.

5. The information set importance determination system as set forth in claim 1, further comprising:

representative page candidate storage means for storing a file name for use in determining said representative page, wherein said representative page determination means, when a plurality of said pages exist whose said number of links from a page outside said information set is the largest and whose said number of links from a page within said information set is the largest, sequentially compares said file name stored in said representative page candidate storage means and a file name that said page has and determines a page whose file name coincides with said stored file name as a representative page of the information set.

6. The information set importance determination system as set forth in claim 1, wherein said representative page determination means checks the number of links to each page in said information set from a page outside said information set and determines that a page whose said number of links is the largest is a representative page of the information set, takes out a low-order directories located at the same depth, and selects a page whose number of link references is the largest in each of said low-order directories and when a total of the numbers of said link references is larger than the number of link references of a page determined as said representative page, recursively executes said representative page determination processing for each said low-order directory.

7. The information set importance determination system as set forth in claim 1, wherein said information set determination means takes out a page stored in said page information management means on a server basis through said page analysis means, selects said representative page from said page on said server, with said representative page as a starting point, sequentially traces a link to a page existing in the same directory as that of said representative page, determines said page obtained to be a member of an information set, and registers said information set obtained in said information set management means.

8. The information set importance determination system as set forth in claim 1, wherein said information set determination means takes out a page stored in said page information management means on a server basis through said page analysis means, selects said representative page from said page on said server, with said representative page as a starting point, sequentially traces a link to a page existing in the same directory as that of said representative page, determines said page obtained to be a member of an information set, and registers said information set obtained in said information set management means, and said information set determination means deletes, from said information set, a page which exists in a directory below the same directory on the said server determining a range of said information set and which is not reachable by sequential tracing of links with said representative page as a starting point, and sets said deleted page to belong to an information set to which a page holding a link to said deleted page belongs.

9. The information set importance determination system as set forth in claim 1, wherein said information tree determination mean, with respect to all the pages in said information set, counts a frequency of parentage as the number of child pages which have each said page as a parent page, and labels a page having said frequency of parentage higher than a predetermined value as "INDEX".

10. The information set importance determination system as set forth in claim 1, further comprising:

information set selection means for selecting said information set closely related, and information set aggregation means for aggregating a plurality of said information sets selected by said information set selection means to generate a new information set.

11. The information set importance determination system as set forth in claim 1, further comprising:

information set selection means for selecting said information set closely related, and information set aggregation means for aggregating a plurality of said information sets selected by said information set selection means to generate a new information set, wherein said information set selection means generates a new information set based on overlap in position on a network to which said information set belongs.

12. The information set importance determination system as set forth in claim 1, further comprising:
  information set selection means for selecting said information set closely related, and
  information set aggregation means for aggregating a plurality of said information sets selected by said information set selection means to generate a new information set, wherein
    said information set selection means counts the number of links existing between said information sets to take an information set whose said number of links exceeds a fixed value as a new information set.

13. The information set importance determination system as set forth in claim 1, further comprising:
  information set selection means for selecting said information set closely related, and
  information set aggregation means for aggregating a plurality of said information sets selected by said information set selection means to generate a new information set, wherein
    said information set selection means
    calculates an intensity of a relation between the plurality of said information sets using overlap in position on a network to which said information set belongs and the number of links existing between said information sets, and
    takes an information set whose said intensity of a relation exceeds a fixed value as a new information set.

14. The information set importance determination system as set forth in claim 1, wherein
  said page set sorting means for sorting and outputting said page sets applied according to said information set and a structure of said information tree of said information set.

15. The information set importance determination system as set forth in claim 1, wherein
  page set sorting means for sorting and outputting said page sets applied according to said information set and a structure of said information tree of said information set, wherein
    said page set sorting means
    groups said page sets applied on said information set basis,
    checks said importance preset for a page belonging to each said group,
    sets the maximum value of said importance as a group importance,
    sorts each said group based on said group importance, and
    sequentially outputs pages in said group in descending order of said page importance based on the sorting results of said group.

16. The information set importance determination system as set forth in claim 1, wherein
  page set sorting means for sorting and outputting said page sets applied according to said information set and a structure of said information tree of said information set, wherein
    said page set sorting means
    checks said importance preset for a page belonging to each said group,
    sets the maximum value of said importance as a group importance,
    sorts each said group based on said group importance,
    checks a parent page of each page belonging to said group,
    when said parent page is a representative page or a page having a label "INDEX" and fails to exist in the group, inserts said parent page into the group, and
    sequentially outputs pages in said group in descending order of said page importance based on sorting results of said group.

17. The information set importance determination system as set forth in claim 1, wherein
  page set sorting means for sorting and outputting said page sets applied according to said information set and a structure of said information tree of said information set, wherein
    said page set sorting means
    checks said importance preset for a page belonging to each said group,
    sets the maximum value of said importance as a group importance,
    sorts each said group based on said group importance,
    checks a parent page of each page belonging to said group,
    when said parent page is a representative page or a page having a label "INDEX" and fails to exist in the group, inserts said parent page into the group,
    sequentially outputs pages in said group in descending order of said page importance based on sorting results of said group, and
    when the number of child pages linked by a page having said "INDEX" label within said group exceeds a fixed value, deletes said child pages except for a fixed number of child pages whose said page importance is high and outputs the remaining child pages.

18. An information set importance determination method, comprising the steps of:
  storing an attribute of page information constituting hyper-media information on a network in page information management means and linkage between said page information in link information management means,
  checking link references to each said page to determine a weight of each link,
  determining an importance of each said page using the obtained weight of said link and said page information, and
  sorting a page set made up of a plurality of pages applied from an input device based on said importance of each said page and outputting sorting results to an output device;
  taking out said page information stored in said page information management means on a server basis,
  determining pages under a route directory on said server as a first information set on said server,
  checking the number of links of pages immediately under said route directory from a page outside said server,
  determining a page whose number of links made is the largest as a representative page of said first information set,
  when said representative page of an information set to which each said page belongs is not included in said page set applied from said input device, inserting said representative page into said page set, and
  sorting said page set based on said information set and said importance of each said page to output sorting results to an output device, wherein determining a page as a representative page includes using the page information management means and the link information management means wherein
when said representative page of an information set to which each said page belongs is not included in said page set applied from an input device, inserting said representative page into said page set, sorting said page set based on said information set and an importance of each page, and outputting sorting results to an output device, and when a plurality of pages exist whose said number of links from a page outside said information set is the largest, determining that a page whose said number of links from a page within said information set is the largest is a representative page of the information set, and further:

determining a main relationship of each page in said information set and setting a parent page of each said page and a role in said information set at said page management means, sequentially taking out an information set and a page as an element of the information set, with respect to all said pages taken out, counting the number of links from a page within said information set, setting a link source page of a page whose said number of links made is 1 as a parent page, sequentially taking out a sub-directory in ascending order of layer, checking a link source page linking a child page belonging to a sub-directory of said page, with respect to each said link source page, counting a frequency of parentage as the number of links to a page in a directory, starting with said link source page having the largest number of links among said link source pages, sequentially setting said link source page as a parent page of each child page linked to said link source page, and executing a series of the foregoing processing to all the pages to set a parent page.

19. The information set importance determination method as set forth in claim 18, further comprising the steps of:

grouping applied page sets on an information set basis, checking an importance preset for a page belonging to each group, setting the maximum value of the importance as a group importance, sorting each group based on said group importance, and sequentially outputting pages in a group in descending order of page importance based on the group sorting results.

20. The information set importance determination method as set forth in claim 18, further comprising the steps of:

grouping applied page sets on an information basis, checking an importance preset for a page belonging to each group, setting the maximum value of the importance as a group importance, sorting each group based on said group importance, sequentially outputting pages in a group in descending order of page importance based on the group sorting results, checking said importance preset for a page belonging to each said group, setting the maximum value of said importance as said group importance, sorting these groups based on said group importance, checking a parent page of each page belonging to a group, when said parent page is a representative page or a page having a label "INDEX" and fails to exist in a group, inserting said parent page into the group, sequentially outputting pages in a group in descending order of the page importance based on group sorting results, and when the number of child pages liked by a page having said "INDEX" label within said group exceeds a fixed value, deleting said child pages except for a fixed number of child pages whose said page importance is high and outputting the remaining child pages.

21. A computer readable memory which records an information set importance determination program to be executed by a computer, wherein said information set importance determination program executes the processing of:

collecting a page existing on each server from hypermedia information on a network to obtain a link reference state of each said page within and outside each said server, determining an importance of each said page using said link reference state, and executing processing of sorting a page set made up of a plurality of said pages based on said page importance of each said page; and determining a page whose number of links is the largest as a representative page of the information set, wherein determining a page includes using the link reference state wherein when said representative page of an information set to which each said page belongs is not included in said page set applied from an input device, inserting said representative page into said page set, sorting said page set based on said information set and an importance of each page, and outputting sorting results to an output device, and when a plurality of pages exist whose said number of links from a page outside said information set is the largest, determining that a page whose said number of links from a page within said information set is the largest is a representative page of the information set, and further:

determining a main relationship of each page in said information set and setting a parent page of each said page and a role in said information set at said page management means, sequentially taking out an information set and a page as an element of the information set, with respect to all said pages taken out, counting the number of links from a page within said information set, setting a link source page of a page whose said number of links made is 1 as a parent page, sequentially taking out a sub-directory in ascending order of layer, checking a link source page linking a child page belonging to a sub-directory of said page, with respect to each said link source page, counting a frequency of parentage as the number of links to a page in a directory, starting with said link source page having the largest number of links among said link source pages, sequentially setting said link source page as a parent page of each child page linked to said link source page, and executing a series of the foregoing processing to all the pages to set a parent page.

22. A computer readable memory which records an information set importance determination program to be executed by a computer, said information set importance determination program controlling the computer to execute:

page information management processing of managing an attribute of page information constituting said hyper-media information, link information management processing of holding and managing linkage between said page information, page information registration processing of registering said hyper-media information for said page information management processing and said link information management processing, page analysis processing of determining an importance of each said page, link analysis processing of determining a weight of each link based on said link information, page set sorting processing of sorting said page set based on said page importance of each said page; and representative page processing for determining a page representative of an information set, wherein the representative page processing for determining a page representative of an information set determines a page to be a representative page of the information set from among pages managed by the page information management processing using the page analysis processing the link analysis processing, and wherein when said representative page of an information set to which each said page belongs is not included in said page set applied from an input device, inserting said representative page into said page set, sorting said page set based on said information set and an importance of each page, and outputting sorting results to an output device, and when a plurality of pages exist whose said number of links from a page outside said information set is the largest, determining that a page whose said number of links from a page within said information set is the largest is a representative page of the information set, and further:

determining a main relationship of each page in said information set and setting a parent page of each said page and a role in said information set at said page management means, sequentially taking out an information set and a page as an element of the information set, with respect to all said pages taken out, counting the number of links from a page within said information set, setting a link source page of a page whose said number of links made is 1 as a parent page, sequentially taking out a sub-directory in ascending order of layer, checking a link source page linking a child page belonging to a sub-directory of said page, with respect to each said link source page, counting a frequency of parentage as the number of links to a page in a directory, starting with said link source page having the largest number of links among said link source pages, sequentially setting said link source page as a parent page of each child page linked to said link source page, and executing a series of the foregoing processing to all the pages to set a parent page.

23. The computer readable memory which records an information set importance determination program to be executed by a computer as set forth in claim 21, wherein said information set importance determination program executes:

information set management processing of managing a range of an information set to which each said page belongs and said page as an element of the information set, and information set determination processing of determining an information set to which each said page belongs, wherein in said page set sorting processing, said page set applied from an input device is sorted based on said information set and said importance of each page to output the sorting results to an output device.

24. The computer readable memory which records an information set importance determination program to be executed by a computer as set forth in claim 21, said information set importance determination program comprising:

information set management processing of managing a range of an information set to which each said page belongs and said page as an element of the information set, and information set determination processing of determining an information set to which each said page belongs, wherein in said page set sorting processing, said page set applied from an input device is sorted based on said information set and said importance of each page to output the sorting results to an output device, and further comprising:

information tree determination processing of determining a main relationship of each page in said information set and setting a parent page of each said page and a role in said information set at said page management processing, wherein in said information tree determination processing an information set and a page as an element of the information set are sequentially taken out from said information set management means, the number of links of each of all the taken out page from a page within an information set is counted, a link source page of a page whose said number of links made is 1 is set as a parent page, a sub-directory is taken out in a descending order of layer, a link source page linking a child page belonging to a sub-directory of said page is checked, with respect to each said link source page, a frequency of parentage as the number of links to a page in a directory is counted, starting with said link source page having the largest number of links among said link source pages, said link source page is sequentially set as a parent page of each child page linked to said link source page, and a series of the foregoing processing is executed to all the pages to set a parent page.

25. The computer readable memory which records an information set importance determination program to be executed by a computer as set forth in claim 21, said information set importance determination program comprising:

information set management processing of managing a range of an information set to which each said page belongs and said page as an element of the information set, and information set determination processing of determining an information set to which each said page belongs, wherein in said page set sorting processing, said page set applied from an input device is sorted based on said information set and said importance of each page to output the sorting results to an output device, and further comprising:

page set sorting processing of sorting and outputting said page set applied according to said information set and a structure of said information tree of said information set, said page set sorting processing including the steps of:

grouping said page sets applied on said information set basis, checking said importance preset for a page belonging to each said group, setting the maximum value of the importance as a group importance, sorting each said group based on said group importance, and sequentially outputting pages in said group in descending order of said page importance based on the sorting results of said group.

26. The computer readable memory which records an information set importance determination program to be executed by a computer as set forth in claim 28, said information set importance determination program comprising:

information set management processing of managing a range of an information set to which each said page belongs and said page as an element of the information set, and information set determination processing of determining an information set to which each said page belongs, wherein in said page set sorting processing, said page set applied from an input device is sorted based on said information set and said importance of each page to output the sorting results to an output device, and further comprising:

page set sorting processing of sorting and outputting said page set applied according to said information set and a structure of said information tree of said information set, said page set sorting processing including the steps of:

grouping said page sets applied on said information set basis, checking said importance present for a page belonging to each said group, setting the maximum value of the importance as a group importance, sorting each said group based on said group importance, sequentially outputting pages in said group in descending order of said page importance based on the sorting results of said group, checking said importance preset for a page belonging to each said group, setting the maximum value of the importance as a group importance, sorting each said group based on said group importance, checking a parent page of each page belonging to said group, when said parent page is a representative page or a page having a label "INDEX" and fails to exist in a group, inserting said parent page into the group, sequentially outputting pages in said group in descending order of said page importance based on sorting results of said group, and when the number of child pages linked by a page having said "INDEX" label within said group exceeds a fixed value, deleting said child pages except for a fixed number of child pages whose said page importance is high and outputting the remaining child pages.

27. The information set importance determination system as set forth in claim 1, wherein the representative page determination means counts a number of links made outside each said server to a page stored in the page information management means to determine a representative page of the information set.

28. The information set importance determination system as set forth in claim 1, wherein the representative page determination means counts a number of links made within each said server to a page stored in the page information management means to determine a representative page of the information set.

* * * * *